US012659822B2

(12) United States Patent
Fehrenbach et al.

(10) Patent No.: US 12,659,822 B2
(45) Date of Patent: Jun. 16, 2026

(54) TIME TO TRIGGER AND CONDITIONAL HANDOVER ENHANCEMENTS

(71) Applicant: KONINKLIJKE PHILIPS N.V., Eindhoven (NL)

(72) Inventors: Thomas Fehrenbach, Berlin (DE); Baris Göktepe, Berlin (DE); Cornelius Hellge, Berlin (DE); Thomas Wirth, Berlin (DE); Thomas Schierl, Berlin (DE); Nithin Srinivasan, Berlin (DE)

(73) Assignee: Koninklijke Philips N.V., Einhoven (NL)

( * ) Notice: Subject to any disclaimer, the term of this patent is extended or adjusted under 35 U.S.C. 154(b) by 917 days.

(21) Appl. No.: 17/586,866

(22) Filed: Jan. 28, 2022

(65) Prior Publication Data

US 2022/0159541 A1 May 19, 2022

Related U.S. Application Data

(63) Continuation of application No. PCT/EP2020/070886, filed on Jul. 23, 2020.

(30) Foreign Application Priority Data

Jul. 30, 2019 (EP) .................................... 19189146

(51) Int. Cl.
H04W 36/00 (2009.01)
H04W 36/30 (2009.01)
H04W 36/36 (2009.01)

(52) U.S. Cl.
CPC ... *H04W 36/00837* (2018.08); *H04W 36/304* (2023.05); *H04W 36/362* (2023.05)

(58) Field of Classification Search
None
See application file for complete search history.

(56) References Cited

U.S. PATENT DOCUMENTS 9,130,688 B2 9/2015 Yiu et al.
2009/0059871 A1 3/2009 Nader et al.
(Continued)

FOREIGN PATENT DOCUMENTS

EP 2807861 A1 12/2014
KR 10-2017-0038771 A 4/2017
(Continued)

OTHER PUBLICATIONS

Zhou Yuzhe et al., "Handover schemes and algorithms of high-speed mobile environment: A survey", Computer Communications, Elsevier Science Publishers BV, Amsterdam, NL, (Apr. 18, 2014), vol. 47, pp. 1-15, XP029032322.
(Continued)

*Primary Examiner* — Suhail Khan

(57) ABSTRACT

An apparatus for a wireless communication system is described, where the wireless communication system includes one or more UEs and a plurality of cells. A UE entering into a predefined handover event measures a channel condition of one or more neighboring cells for a predefined time, e.g., the time to trigger, TTT. The apparatus adapts the TTT based on one or more channel conditions of the one or more neighboring cells.

20 Claims, 13 Drawing Sheets

(56)                References Cited

U.S. PATENT DOCUMENTS

| | | | | |
|---|---|---|---|---|
| 2016/0337928 A1* | 11/2016 | Yang | | H04W 36/30 |
| 2021/0235297 A1* | 7/2021 | Maattanen | | H04W 80/02 |

FOREIGN PATENT DOCUMENTS

| | | |
|---|---|---|
| WO | 2014189448 A1 | 11/2014 |
| WO | 2018063425 A1 | 4/2018 |

OTHER PUBLICATIONS

Spreadtrum Communications, "NR-U Measurement and Mobility Consideration", vol. RAN WG2, No. Xi'an, China; Apr. 8, 2019-Apr. 12, 2019, (Apr. 6, 2019), 3GPP Draft; R2-1903790 NR-U Measurement and Mobility Consideration, 3rd Generation Partnership Project (3GPP), Mobile Competence Centre ; 650, Route Des Lucioles ; F-06921 Sophia-Antipolis Cedex ; FRA, XP051701120, Apr. 8-12, 2019, Xi'an, China.

3GPP TS 25.331 V15.4.0, "Radio Resource Control (RRC); Protocol specification (Release 15)", Sep. 2018.

3GPP TS 25.304 V15.0.0, "User Equipment (UE) procedures in idle mode and procedures for cell reselection in connected mode (Release 15)", Jun. 2018.

Nokia, Alcatel-Lucent Shanghai Bell, Mobility Measurements in Connected Mode[online], 3GPP TSG RAN WG2 #97bis R2-1703163, Internet<URL:http://www.3gpp.org/ftp/tsg_ran/WG2_RL2/TSGR2_97bis/Docs/R2-1703163.zip>, Mar. 24, 2017.

Intel Corporation, CHO execution condition[online], 3GPP TSG RAN WG2#106 R2-1906287, Internet<URL:https://www.3gpp.org/ftp/tsg_ran/WG2_RL2/TSGR2_106/Docs/R2-1906287.zip>, May 3, 2019.

Huawei, HiSilicon, Discussion on height dependent TTT[online], 3GPPTSG RAN WG2 #103 R2-1812081, Internet<URL:http://www.3gpp.org/ftp/tsg_ran/WG2_RL2/TSGR2_103/Docs/R2-1812081.zip>, Sep. 8, 2018.

ETRI: "TTT in Conditional Handover", 3GPP Draft; R2-1815246-TTT in Conditional Handover, vol. RAN WG2, No. Chengdu, China; Oct. 8, 2018-Oct. 12, 2018 Sep. 28, 2018 (Sep. 28, 2018), XP051524604, Retrieved from the Internet on Sep. 28, 2018 URL:http://www.3gpp.org/ftp/tsg%5Fran/WG2%5FRL2/TSGR2%5F103bis/ Docs/R2%2D1815246%2Ezip.

Huawei et al: "Introduction of height dependant TTT for Aerial Vehicles for TS 36.331", 3GPP Draft; R2-1802654, vol. RAN WG2, No. Athens, Greece; Feb. 26, 2018-Mar. 2, 2018 Feb. 14, 2018 (Feb. 14, 2018), XP051399270, Retrieved from the Internet on Feb. 14, 2018 URL:http://www.3gpp.org/ftp/tsg%5Fran/WG2%5FRL2/TSGR2%5F101 / Docs.

Fraunhofer HHI et al: "Time to trigger for CHO execution condition", 3GPP Draft; R2-1910545, vol. Ran WG2, No. Prague, Czech Republic; Aug. 26, 2019-Aug. 30, 2019 Aug. 15, 2019 (Aug. 15, 2019), XP051768321, Retrieved from the Internet on Aug. 15, 2019 URL:http://www.3gpp.org/ftp/tsg_ran/WG2_RL2/TSGR2_ 107/ Docs/ R2-1910545.zip.

* cited by examiner

100

102 — core network external networks backhaul 114

RAN₁

RAN₂

RANₙ

108₁      108₂

UE₁

UE₂ gNBs ← → core gNB₂

116₂      114₂

106₂

ANT gNBs ← → gNB₁

116₁      114₁

106₁

112₂      108₃      112₁

110₁

IoT      UE₃

IoT gNBs ← → core gNB₄      114₄

116₄

110₂

106₄ gNBs ← → gNB₅

116₅      114₅

106₅

RANn gNBs ← → gNB₃

116₃      114₃

106₃

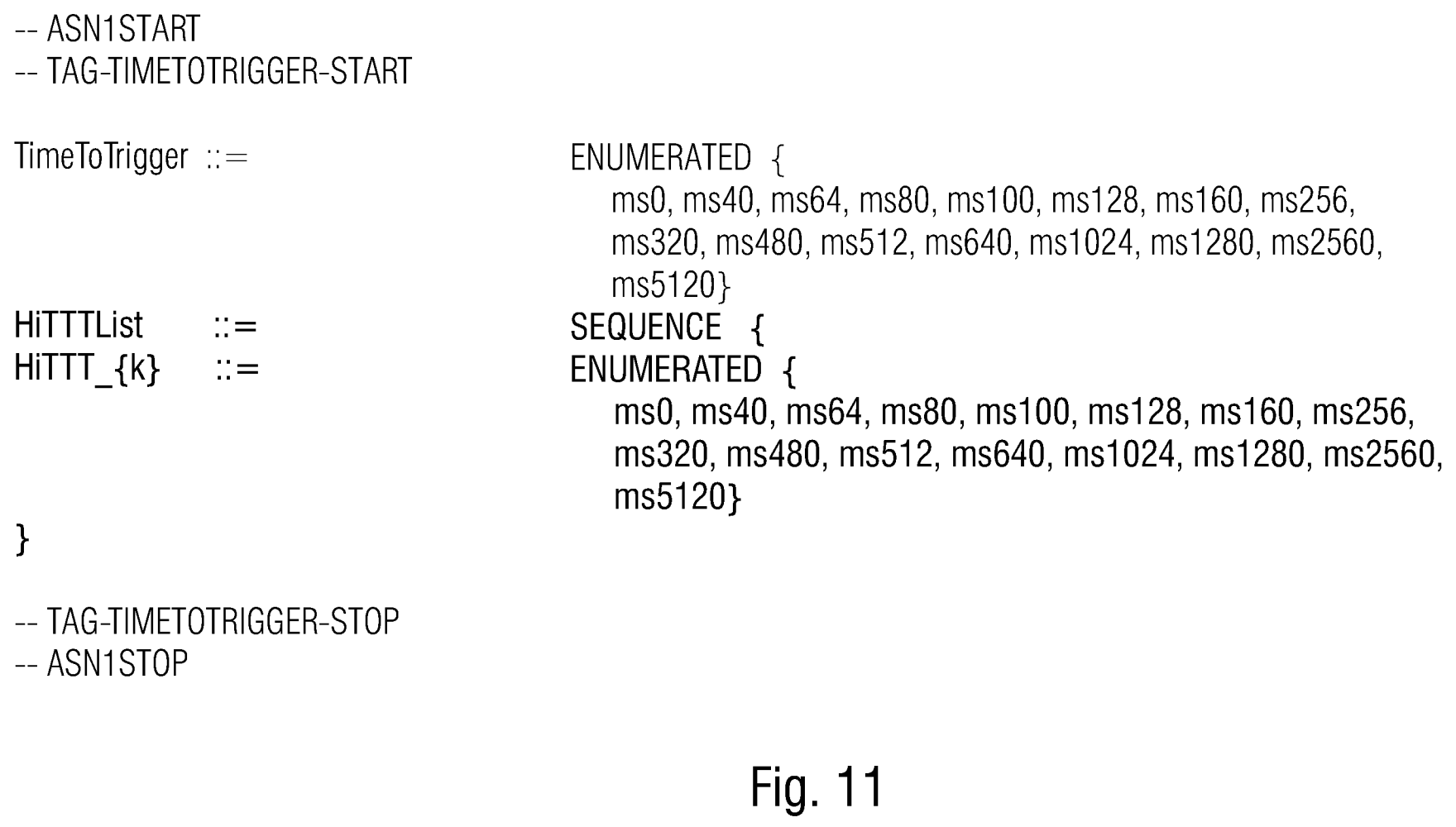

```
-- ASN1START
-- TAG-TIMETOTRIGGER-START

TimeToTrigger ::=    ENUMERATED {
                        ms0, ms40, ms64, ms80, ms100, ms128, ms160, ms256,
                        ms320, ms480, ms512, ms640, ms1024, ms1280, ms2560,
                        ms5120}

HiTTTList     ::=    SEQUENCE {
HiTTT_{k}     ::=    ENUMERATED {
                        ms0, ms40, ms64, ms80, ms100, ms128, ms160, ms256,
                        ms320, ms480, ms512, ms640, ms1024, ms1280, ms2560,
                        ms5120}
}

-- TAG-TIMETOTRIGGER-STOP
-- ASN1STOP
```

Fig. 11

TIME TO TRIGGER AND CONDITIONAL HANDOVER ENHANCEMENTS

CROSS-REFERENCES TO RELATED APPLICATIONS

This application is a continuation of copending International Application No. PCT/EP2020/070886, filed Jul. 23, 2020, which is incorporated herein by reference in its entirety, and additionally claims priority from European Application No. EP 19189146.4, filed Jul. 30, 2019, which is incorporated herein by reference in its entirety.

The present application concerns the field of wireless communication systems or networks, more specifically, enhancements or improvements for a handover process among entities of the wireless communication network. Embodiments concern time-to-trigger, TTT, and conditional handover, CHO, enhancements.

BACKGROUND OF THE INVENTION

FIG. 1 is a schematic representation of an example of a terrestrial wireless network 100 including, as is shown in FIG. 1(a), a core network 102 and one or more radio access networks RAN$_1$, RAN$_2$, . . . . RAN$_N$. FIG. 1(b) is a schematic representation of an example of a radio access network RAN$_n$ that may include one or more base stations gNB$_1$ to gNB$_5$, each serving a specific area surrounding the base station schematically represented by respective cells 106$_1$ to 106$_5$. The base stations are provided to serve users within a cell. It is noted that a base station may also operate multiple, i.e., two or more cells (not illustrated in FIG. 1), and, in case a base station operates multiple cells, neighboring cells may include cells operated by the same base station and/or cells operated by the different base stations, i.e., a neighboring cell may also be a different cell of the same base station or a different cell of a different same base station. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the RAN$_n$ may include more or less such cells, and RAN$_n$ may also include only one base station. FIG. 1(b) shows two users UE$_1$ and UE$_2$, also referred to as user equipment, UE, that are in cell 106$_2$ and that are served by base station gNB$_2$. Another user UE$_3$ is shown in cell 106$_4$ which is served by base station gNB$_4$. The arrows 108$_1$, 108$_2$ and 108$_3$ schematically represent uplink/downlink connections for transmitting data from a user UE$_1$, UE$_2$ and UE$_3$ to the base stations gNB$_2$, gNB$_4$ or for transmitting data from the base stations gNB$_2$, gNB$_4$ to the users UE$_1$, UE$_2$, UE$_3$. This may be realized on licensed bands or on unlicensed bands. Further, FIG. 1(b) shows two IoT devices 110$_1$ and 110$_2$ in cell 106$_4$, which may be stationary or mobile devices. The IoT device 110$_1$ accesses the wireless communication system via the base station gNB$_4$ to receive and transmit data as schematically represented by arrow 112$_1$. The IoT device 110$_2$ accesses the wireless communication system via the user UEs as is schematically represented by arrow 112$_2$. The respective base station gNB$_1$ to gNB$_5$ may be connected to the core network 102, e.g. via the S1 interface, via respective backhaul links 114$_1$ to 114$_5$, which are schematically represented in FIG. 1(b) by the arrows pointing to "core". The core network 102 may be connected to one or more external networks. Further, some or all of the respective base station gNB$_1$ to gNB$_5$ may connected, e.g. via the S1 or X2 interface or the XN interface in NR, with each other via respective backhaul links 1161 to 1165, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSCCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NU-U, New Radio Unlicensed, standard.

The wireless network or communication system depicted in FIG. 1 may by a heterogeneous network having distinct overlaid networks, e.g., a network of macro cells with each macro cell including a macro base station, like base station gNB$_1$ to gNB$_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication systems or networks, like those described above with reference to FIG. 1, for example in a LTE or 5G/NR network, the respective entities may communicate using a plurality of frequency bands, also referred to as a wideband operation. In a wideband operation, for example, the base station, gNB, and/or the user device, UE, may transmit on multiple subbands. The subbands may have different bandwidths or the same bandwidth, like 20 MHz. Some or all of the subbands may be unlicensed bands. For communicating on an unlicensed band, the gNB and UE perform listen-before-talk, LBT, separately per unlicensed subband which may lead to a situation that one or more of the subbands to be used for the wideband operation, also referred to as a subset of the subbands, is busy or occupied due to a transmission or interference by one or more other public land mobile networks, PLMNs, or by one or more other communication systems coexisting on the same frequency band, for example systems operating in accordance with the IEEE 802.11 specification.

SUMMARY

An embodiment may have an apparatus for a wireless communication system,
wherein the wireless communication system includes one or more UEs and a plurality of cells, and wherein a UE entering into a predefined handover event is to measure a channel condition of one or more neighboring cells for a predefined time, e.g., the time to trigger, TTT, and
wherein the apparatus is to adapt the TTT based on one or more channel conditions of the one or more neighboring cells.
Another embodiment may have an apparatus for a wireless communication system,
wherein the wireless communication system includes one or more UEs and a plurality of cells, and wherein a UE entering into a predefined handover event is to measure a channel condition, like the signal strength, of one or more neighboring cells for a predefined time, e.g., the time to trigger, TTT, and
wherein the apparatus is to configure the UE with a plurality of TTTs and one or more channel condition thresholds, wherein a TTT is selected from the plurality of TTTs based on the one or more channel condition thresholds.
Yet another embodiment may have a user device, UE, for a wireless communication system,
wherein the wireless communication system includes one or more UEs and a plurality of cells, and
wherein the UE is to be served by a serving cell,
wherein the UE, when entering into a predefined handover event, is not to break a connection with the serving cell during the handover procedure, and is to measure a channel condition, like the signal strength, of one or more neighboring cells for a predefined time, e.g., the time to trigger, TTT, and
wherein the UE is to receive from the serving cell or another network entity an adapted TTT using, e.g., an RRC configuration/reconfiguration message or any other form of signaling, the adapted TTT based on channel conditions of the one or more neighboring cells.

Still another embodiment may have a user device, UE, for a wireless communication system,
wherein the wireless communication system includes one or more UEs and a plurality of cells, and
wherein the UE is to be served by a serving cell,
wherein the UE, when entering into a predefined handover event, is to measure a channel condition, like the signal strength, of one or more neighboring cells for a predefined time, e.g., the time to trigger, TTT, and
wherein the UE is to receive from the serving cell or another network entity a plurality of TTTs and one or more channel condition thresholds, and to select a TTT from the plurality of TTTs based on the one or more channel condition thresholds.
Another embodiment may have a user device, UE, for a wireless communication system,
wherein the wireless communication system includes one or more UEs and a plurality of cells,
wherein, when entering into a predefined handover event, e.g., a conditional handover or a traditional handover, like the Release-15/legacy handover mechanism, the UE is to execute the handover in case one or more predefined conditions are satisfied over a certain period.
According to another embodiment, a wireless communication system may have: one or more UEs, and one or more cells, wherein one or more of the UEs includes an inventive apparatus or an inventive UE, and/or wherein one or more of the cells includes an inventive apparatus.
Yet another embodiment may have a method for operating a wireless communication system, wherein the wireless communication system includes one or more UEs and a plurality of cells, and wherein a UE entering into a predefined handover event is to measure a channel condition of one or more neighboring cells for a predefined time, e.g., the time to trigger, TTT, which method may have the step of: adapting the TTT based on one or more channel conditions of the one or more neighboring cells.
Yet another embodiment may have a method for operating a wireless communication system, wherein the wireless communication system includes one or more UEs and a plurality of cells, and wherein a UE entering into a predefined handover event is to measure a channel condition, like the signal strength, of one or more neighboring cells for a predefined time, e.g., the time to trigger, TTT, which method may have the step of: configuring the UE with a plurality of TTTs and one or more channel condition thresholds, wherein a TTT is selected from the plurality of TTTs based on the one or more channel condition thresholds.
According to still another embodiment, a method for operating a wireless communication system, wherein the wireless communication system includes one or more UEs and a plurality of cells, may have the steps of: serving a UE by a serving cell, when entering into a predefined handover event, maintaining, by the UE, a connection with the serving cell during the handover procedure, measuring, by the UE, a channel condition, like the signal strength, of one or more neighboring cells for a predefined time, e.g., the time to trigger, TTT, and receiving, at the UE, from the serving cell or another network entity an adapted TTT using, e.g., an RRC configuration/reconfiguration message or any other form of signaling, the adapted TTT based on channel conditions of the one or more neighboring cells.

According to another embodiment, a method for operating a wireless communication system, wherein the wireless communication system includes one or more UEs and a plurality of cells, may have the steps of:

serving a UE by a serving cell, when entering into a predefined handover event, measuring, by the UE, a channel condition, like the signal strength, of one or more neighboring cells for a predefined time, e.g., the time to trigger, TTT, and receiving, at the UE, from the serving cell or another network entity a plurality of TTTs and one or more channel condition thresholds, and selecting, by the UE, a TTT from the plurality of TTTs based on the one or more channel condition thresholds.

According to yet another embodiment, a method for operating a wireless communication system, wherein the wireless communication system includes one or more UEs and a plurality of cells, may have the steps of:

serving a UE by a serving cell, when entering into a predefined handover event, e.g., a conditional handover or a traditional handover, like the Release-15/legacy handover mechanism, executing, by the UE, the handover in case one or more predefined conditions are satisfied over a certain period.

According to still another embodiment, a non-transitory digital storage medium may have a computer program stored thereon to perform one or more inventive methods, when said computer program is run by a computer.

It is noted that the information in the above section is only for enhancing the understanding of the background of the invention and therefore it may contain information that does not form conventional technology that is already known to a person of ordinary skill in the art.

Starting from conventional technology as described above, there may be a need for improvements in the communication among entities of a wireless communication system or network in a handover situation, e.g., for avoiding ping-pong effects during handover.

BRIEF DESCRIPTION OF THE DRAWINGS

Embodiments of the present invention will be detailed subsequently referring to the appended drawings, in which:

FIGS. 5(*a*)-5(*b*) illustrate an embodiment of a multi-bit design for the indication of the minimum value and the maximum value of a TTT;

FIGS. 6(*a*)-6(*b*) illustrate a multi-bit design for indicating both the min-max and single fixed values in accordance with an embodiment of the present invention;

FIG. 11 illustrates an example of a modified existing Timed-To-Trigger IE including the hierarchical TTT configuration list;

DETAILED DESCRIPTION OF THE INVENTION

Figures 1A, 1B:
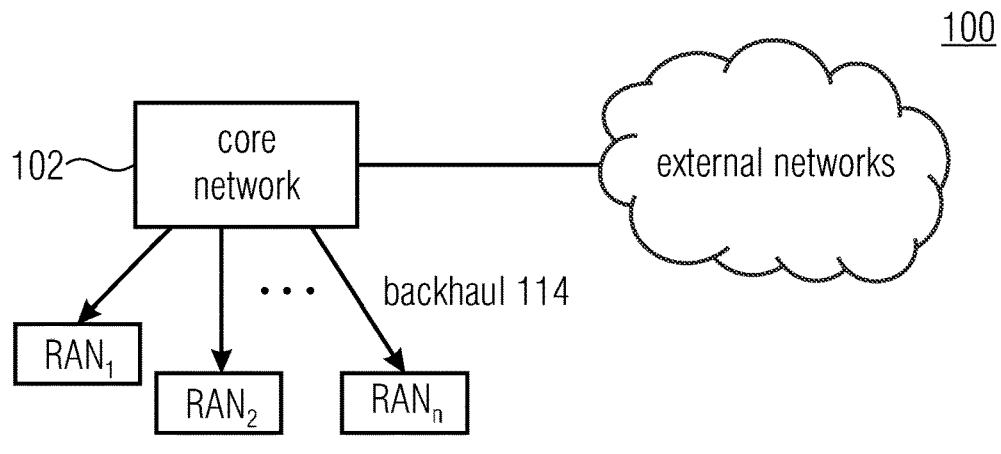
FIGS. 1(*a*)-1(*b*) show a schematic representation of an example of a wireless communication system.

Embodiments of the present invention are now described in more detail with reference to the accompanying drawings in which the same or similar elements have the same reference signs assigned.

In a wireless communication system or network as described above a user device, like a UE, may experience situations or events involving a handover from a currently used base station, also referred to the serving base station or serving gNB, to a new base station, also referred to as the target base station or target gNB, e.g., to ensure continuity of the connection and/or certain requirements for a service. For example, the 3GPP NR Release-15 mechanism may employ a conditional handover and a make before break, MBB, procedure. Situations or events involving a handover occur in systems operating in the licensed bands, for example NR systems, however, the 5G New Radio (NR) technology may also support operation in unlicensed bands through a technology referred to as NR-based access to unlicensed spectrum (NR-U). The unlicensed spectrum may include bands, e.g., with potential IEEE 802.11 coexistence, such as the 5 GHZ and the 6 GHz bands. NR-U may support bandwidths that are an integer multiple of 20 MHz, for example due to regulatory requirements. Each of the 20 MHz bandwidth channels is designed as a subband, and the splitting into the subbands is performed so as to minimize interference with coexisting systems, like IEE 802.11 systems, which may operate in one or more of the same bands with the same nominal bandwidth channels, like 20 MHz channels. Other examples, of coexisting systems may use frequency bands having subband sizes and nominal frequencies different from the above-described IEEE 802.11 systems. For example, unlicensed frequency bands may be used, for example, the 24 GHz band or the 60 GHz band. Examples of such unlicensed frequency bands include the industrial, scientific and medical, ISM, radio bands reserved internationally for the use of radio frequency energy for industrial, scientific and medical purposes other than telecommunications.

In general, during an operation using one or more unlicensed subbands, for example a transmission spanning 20 MHz or more in the 5 GHz unlicensed band, the transmitter, like the gNB or the UE perform LBT separately on each subband, and once the LBT results are available for each subband, the devices, for example, the gNB in the downlink, DL, or the UE in the uplink, UL, are allowed to only transmit on those subbands which are determined to be free or unoccupied, i.e., to transmit on the won subband. For example, in the 5 GHz unlicensed band, the number of 20 MHz subbands used for a wideband operation may be four, so that the overall bandwidth is 80 MHz, however, the number of actually used subbands may differ.

When operating in an unlicensed band a channel occupancy time, COT, is initiated, e.g., by performing a CAT-4 LBT. For example, within a gNB-initiated COT a UE may use a CAT-2 LBT procedure to transmit a PUCCH or PUSCH. Similarly, for an UE initiated COT using CAT-4 LBT, the gNB or another UE (in SL) may use a CAT-2 LBT for transmitting within the UE-initiated COT a PDCCH or PDSCH. In either case, the gNB or the UE may indicate a maximum time the receiver may transmit within the $COT_{gNB}$ or $COT_{UE}$.

The above-described NR-U systems operating in the unlicensed band may also employ the above-mentioned Release-15 handover mechanism. The following three stages represent the overall handover procedure between a serving gNB (ServgNB) and the target gNB (TargNB).

State 1: In this state, the UE, being connected to the ServgNB, enters into one of a predefined handover-triggering event, for example, the events as defined in the certain standards being referred to as events A1, A2, . . .

State 2: In this state, the UE continues to measure a strength of a neighboring cell or neighboring base station for a time duration that is referred to as the time to trigger, TTT. The UE may be configured to perform certain measurements dependent on the handover-triggering event during a SS/PBCH Block Measurement Time Configuration, SMTC, occasion, or during a discovery measurement-timing configuration, DMTC, occasion for NR-U. Following the TTT, the UE transmits a measurement report, MR, to the ServgNB. In a conditional handover, CHO, the gNB transmits in a CHO configuration an early handover command to the UE setting up a specific handover condition.

State 3: In this state, when successfully meeting the handover condition, the UE initiates the handover procedure by synchronizing, both uplink and downlink, to the TargNB, while staying connected to the ServgNB, in accordance with the MBB procedure.

The measurements may defined by a measurement configuration, like a TTT configuration. The measurement configuration may cover intra-frequency, inter-frequency and inter-RAT mobility.

Figure 2:
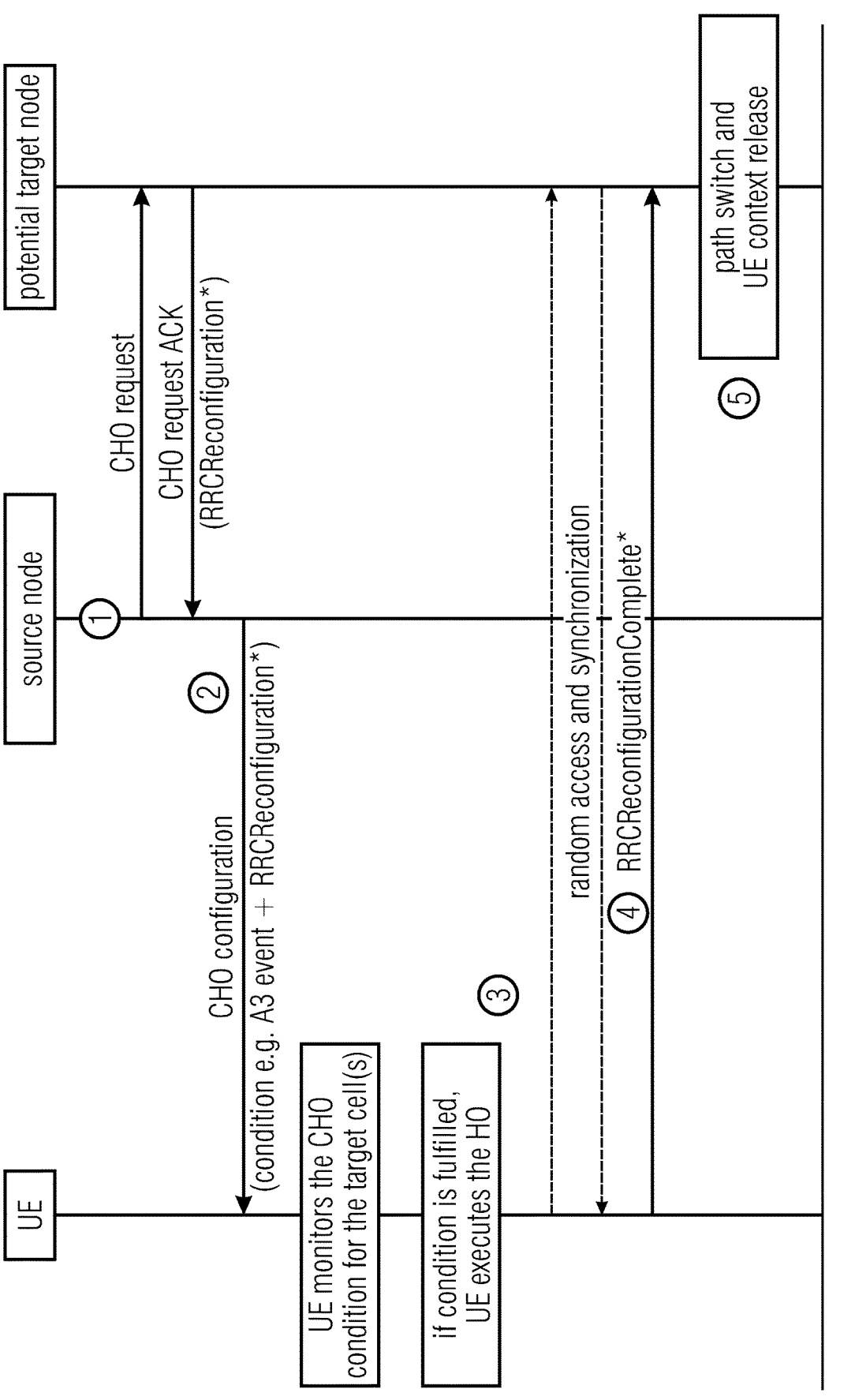
FIG. 2 illustrates the signaling during a conditional handover procedure, CHO procedure.

FIG. 2 illustrates the signaling during a conditional handover procedure, CHO procedure. Initially, as is shown at ① a source node, like the ServgNB, send a CHO request to a potential target node, like a TargNB. The TargNB responds with an acknowledgement of the CHO request, and the ServgNB, at ②, send the CHO configuration to the UE. The UE monitors one or more CHO conditions for the one or more TargNBs which are included in the received CHO configuration. In case the one or more CHO conditions are fulfilled, the UE, as is indicated at ③, executes the handover, HO, to the TargNB including the random access and synchronization. At ④ the UE sends the RRCReconfigurationComplete message to the TargNB, and the TargNB, responsive to the RRCReconfigurationComplete message, causes the path switch and the UE context release as indicated at ⑤.

For a conditional handover the network may configure the UE with one or more triggering conditions (see ② in FIG. 2). Based on the configurations obtained by the network, the UE decides when a handover is executed. When the conditions are fulfilled, the UE executes the handover without any further order from the network (see ③ and ④ in FIG. 2). The advantage of the procedure is that the HO command may be provided to the UE at an earlier stage before the radio conditions actually become poor, which increases the chance of a successful transmission of the message. Furthermore, the CHO allows to perform the HO at an earlier time instance, although the current link may still support a decent link quality. If the HO condition is set accordingly, this allows that a UE experiences a continuous quality-of-service, QoS, e.g. in terms of latency, reliability and throughput, while moving through a network.

The CHO configuration includes triggering events which are similar to the handover events where the UE has to perform measurements to satisfy these events. In essence, the UE performs measurements before and after receiving the CHO configuration. When the UE determines that one or more of these conditions are satisfied for a particular neighboring cell, the UE performs the handover to that particular neighboring cell. It is noted that the CHO configurations may be different for different neighboring cells.

Dependent on a handover event a certain threshold for satisfying a handover event may be employed for the CHO execution, however, this may lead to undesired handovers for users in medium or high mobility as the CHO may satisfy the handover event only momentarily and may not have a stable link. This, in turn, leads to frequent handover attempts and higher rate of handover failures, HOF(s).

The above-mentioned user devices in medium or high mobility may include unmanned area vehicles, UAV(s) or drones. In case of UAV(s) or drone communications, a gNB may receive the MR only in case a certain number N of cells sustained the handover event condition over the TTT. The number of cells implicitly means that the mean value of the signal strength or interference across these cells has achieved a particular threshold. The TTT may be scaled based on a speed of the UE, the so-called mobility speed, using, for example, the mobility state estimation, MSE, parameter.

Thus, in the 3GPP New Radio, NR, and legacy standards, like the LTE standard, once a UE enters into one of the predefined handover events, the UE continues to measure a channel condition, like the signal strength, of the neighboring cell(s) or gNB(s). It is noted that in the description herein the terms cell and gNB or base station are used interchangeably. Moreover, it is noted that a base station may operate multiple, i.e., two or more cells. Further, in case a base station operates multiple cells, neighboring cells may include cells operated by the same base station, i.e., a neighboring cell may also be a different cell of the same base station. The UE continues to measure the signal strength of the one or more neighboring cells for a time which, as mentioned above, is known as the time to trigger, TTT. Within the TTT, in case the UE continues to see a trend that leads the UE into the predefined handover event, the serving gNB of the UE receives a measurement report, MR. Based on the MR, the serving gNB initiates the handover procedure to a target gNB, e.g., based on the above-described conditional handover mechanism or using a legacy handover mechanism. The TTT is provided to reduce the ping-pong effect, i.e., to help the UE to make a stable handover decision as the channel conditions between the gNB and the UE are typically fluctuating instantaneously. Further, due to the fickle nature of the channel over tens of millisecond intervals, it may not invariably be possible for the UE to measure the signal strengths of the strongest neighboring cell(s) during the TTT. Due to the mobility of the UE, this may be due to a temporary blockage of the signal, due to foliage losses, due to coverage holes and the like. As a result, the UE may decide to reselect a cell with less favorable channel conditions, for example with a lower throughput, or it may result in a handover failure, HOF, even though the UE may have had a good channel condition with a strongest neighboring cell.

The above-summarized scenario is also applicable to the above-mentioned NR-U systems operating in the unlicensed spectrum. In NR-U systems, in addition to the fluctuating channel conditions, the transmission from a gNB may also depend on the outcome of the LBT procedure. In NR-U, to provide a fair share of the channel to all other technologies in the unlicensed spectrum, e.g., WiFi, an NR-U system may transmit only if the LBT result was successful, as described above. In case the LBT result was not successful, the gNB is not allowed to transmit and will follow a certain procedure, dependent on the LBT category used. In such a scenario, the UE, during handover, may not be able to measure a signal strength of a strongest neighboring cell in the SS/PBCH Block Measurement Time Configuration, SMTC, location discovery measurement timing configuration, DMTC, location during the TTT. As a result, in case of continuous LBT failures, the UE may assume a failure of the link even though there is a good channel condition between the UE and the gNB. This assumption may cause the UE to reselect a gNB with less favorable channel conditions, for example a lower throughput, or may result in a handover failure.

In addition, when considering the above-mentioned MBB based handover procedure, the UE may disconnect from the ServgNB, i.e., the UE may declare a radio link failure, RLF, due to the bad channel conditions and may continue with the conditional handover procedure based on a preconfigured signaling, for example received from the ServgNB before the disconnection, or the UE may try to perform an initial access to a new cell.

As mentioned above, user devices also include unmanned aerial vehicles or drones, and such UEs may travel at higher speeds and/or higher altitudes when compared to terrestrial UE(s). Such UEs, like drones, may see a larger number of neighboring cell(s) in a line of sight, LOS, by virtue of less obstacles. Further, when considering the higher speed of a drone, which may be up to 160 km/h, a drone may have an evanescent strong channel condition with the one or more neighboring cells. This fleeting nature of the channel condition with the one or more neighboring cells may lead to a higher frequency in the triggering of the MR with inconsistencies between subsequent reporting events which, eventually, results in the high rate of handover failures and handover attempts.

Another issue to be considered when performing a handover procedure is the minimum interruption time, MIT, between handovers. The goal is to minimize the MIT to 0 between handovers. In the above-described scenarios, in case the UE, during the handover procedure, selects another gNB, whilst still being connected to the ServgNB, may achieve a low value for the MIT, potentially Oms. However, in case of a HOF, dependent on the recovery process, which, for example, may be access stratum AS, or non-access stratum, NAS, based, may result in larger values for the MIT.

The present invention provides improvements or enhancements of the handover process, for example, in scenarios as described above, and the subsequently described aspects of the present invention may be applied both in systems operating in the licensed bands, and systems operating in the unlicensed bands or in systems using both a licensed band and the unlicensed band.

Figure 3:
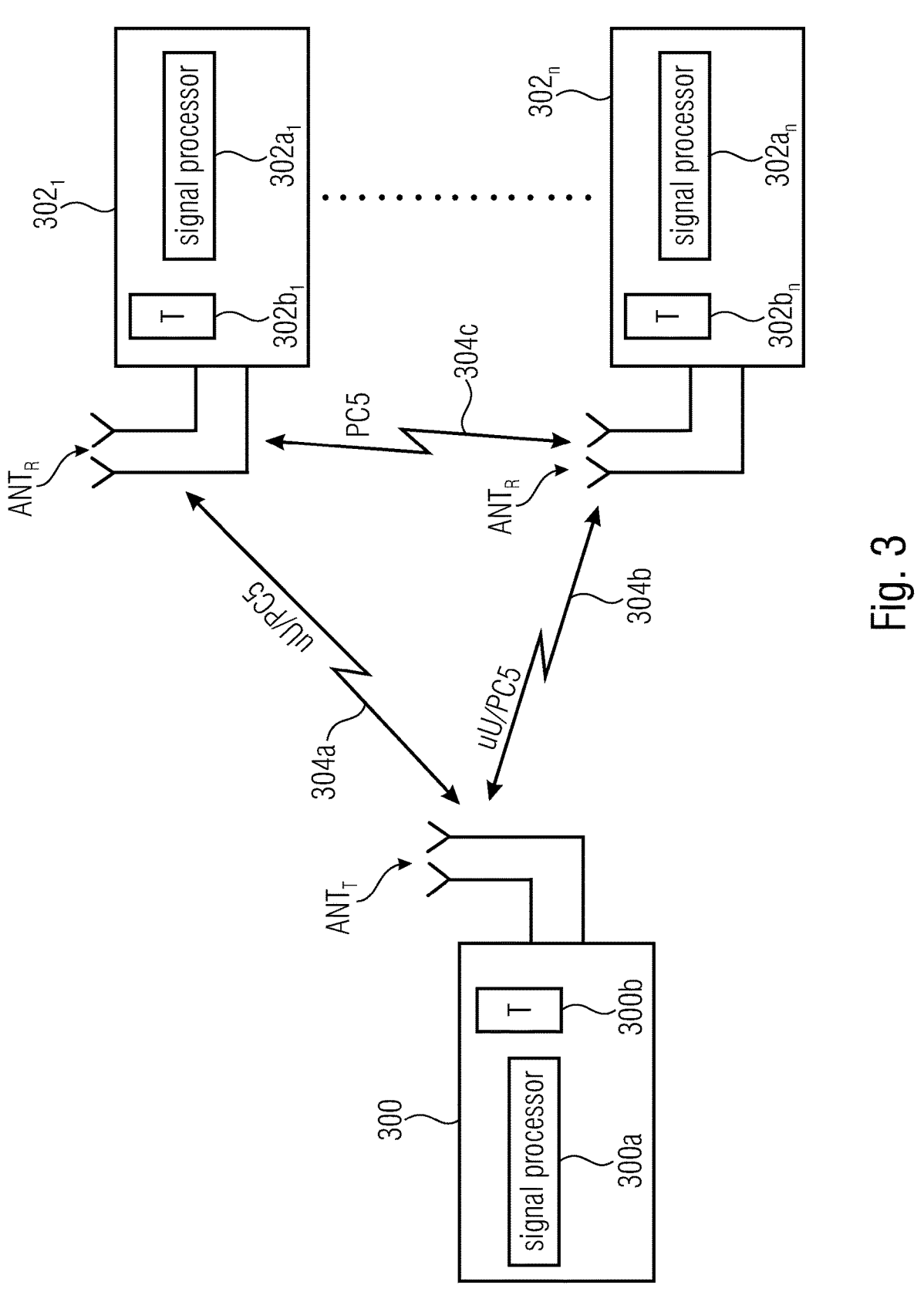
FIG. 3 is a schematic representation of a wireless communication system including a transmitter, like a base station, and one or more receivers, like user devices, UEs.

Embodiments of the present invention may be implemented in a wireless communication system as depicted in FIG. 1 including base stations and users, like mobile terminals or IoT devices. FIG. 3 is a schematic representation of a wireless communication system including a transmitter 300, like a base station, and one or more receivers 3021 to 302n, like user devices, UEs. The transmitter 300 and the receivers 302 may communicate via one or more wireless communication links or channels 304a, 304b, 304c, like a radio link. The transmitter 300 may include one or more antennas ANT$_T$ or an antenna array having a plurality of antenna elements, a signal processor 300a and a transceiver 300b, coupled with each other. The receivers 302 include one or more antennas ANT$_R$ or an antenna array having a plurality of antennas, a signal processor 302a$_1$, 302a$_n$, and a transceiver 302b$_1$, 302b$_n$ coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs 302 and the base stations 300 may operate in accordance with the inventive teachings described herein.

Apparatus—User Device or Basestation

The present invention provides an embodiment of an apparatus for a wireless communication system, wherein the wireless communication system comprises one or more UEs and a plurality of cells, and wherein a UE entering into a predefined handover event is to measure a channel condition of one or more neighboring cells for a predefined time, e.g., the time to trigger, TTT, and wherein the apparatus is to adapt the TTT based on one or more channel conditions of the one or more neighboring cells.

In accordance with embodiments, the one or more channel conditions comprise one or more of:
   a condition of physical time/frequency link between the UE and the one or more neighboring cells, e.g., the signal strength like the Reference Signal Received Power, RSRP, or the Reference Signal Received Quality, RSRQ, or the Signal to Interference plus Noise Ratio, SINR, or Channel State Information, CSI, a channel occupancy, band type, e.g. unlicensed or licensed, frequency range, e.g. FR1, FR2, or FR3, RAT type, e.g. GSM, UMTS, LTE, NR, . . .

SMTC/DMTC periodicity, results of an LBT procedure in case of a communication using one or more unlicensed bands or subbands.

In accordance with embodiments, to adapt the TTT, the apparatus is to extend the TTT by a minimum TTT value to enable the UE to measure a channel condition of the one or more neighboring cells, and to limit the TTT to a predefined maximum TTT value.

In accordance with embodiments, to adapt the TTT, the apparatus is to provide an extended TTT configuration, ExTTTCfg, the extended TTT configuration being represented by at least one of the two information elements, IEs, wherein different extension TTT configurations may be provided for different neighboring cells, wherein a cell may be intra-frequency or inter-frequency or intra-RAT or inter-RAT, wherein a first IE indicates whether the TTT is to be extended or not, and wherein a second IE indicates a minimum value and maximum value for the TTT extension, or a fixed value for the TTT extension.

In accordance with embodiments, in case the second IE indicates a minimum value and maximum value for the TTT extension, using the channel conditions of the one or more neighboring cells, like signal strength, channel occupancy, load, the apparatus is to configure the minimum value based on a neighboring cell having the smallest SS/PBCH Block Measurement Time Configuration, SMTC, periodicity or the smallest discovery measurement-timing configuration, DMTC, periodicity and the maximum value based on a neighboring cell having the largest SMTC or DMTC periodicity.

In accordance with embodiments, the minimum value for the TTT extension is greater than or equal to the smallest SMTC or DMTC periodicity and less than or equal to a largest SMTC or DMTC periodicity, and wherein the maximum value for the TTT extension greater than the a largest SMTC or DMTC periodicity.

In accordance with embodiments, in case the second IE indicates fixed value for the TTT extension, the apparatus is to set the fixed value for the TTT extension based on one or more of the following:

an average of neighboring cell SMTC or DMTC periodicities, a maximum SMTC or DMTC periodicity among the neighboring cell, a minimum SMTC or DMTC periodicity among the neighboring cell, in case of a communication using one or more unlicensed bands or subbands, an additional time to recover from an LBT failure.

In accordance with embodiments, the minimum value and maximum value for the TTT extension are selected from a predefined table of possible values, or are arbitrary values, e.g., an arbitrary value within one or more ranges for the value as defined in a standard specification.

In accordance with embodiments, in case the second IE indicates a minimum value and maximum value for the TTT extension, the minimum value and maximum value are indicated by a plurality of bits, the plurality of bits including a first number of bits, e.g., the least or most significant bits, and a second number of bits, e.g., the most or least significant bits, in case the minimum value and maximum value are to be signaled, the first number of bits represents the minimum value and the second number of bits represents the maximum value, and in case the minimum value and maximum value are to be selected from the predefined table of possible values, the first and second number of bits represent an index in the predefined table.

In accordance with embodiments, in case the second IE indicates a fixed value for the TTT extension, the fixed value is indicated by a plurality of bits, in case the fixed value is to be signaled, the plurality of bits represents the value, and in case the fixed value is to be selected from the predefined table of possible values, the plurality of bits represents an index in the predefined table.

In accordance with embodiments, the second IE includes a plurality of bits, the plurality of bits including a first number of bits, e.g., the least or most significant bits, and a second number of bits, e.g., the most or least significant bits, in case the minimum value and maximum value are to be signaled, the first number of bits represents the minimum value and the second number of bits represents the maximum value, in case the minimum value and maximum value are to be selected from the predefined table of possible values, one of the first and second number of bits represents a predefined pattern indicating that the minimum value and maximum value are selected from the predefined table, and the other one of the first and second number of bits indicates an index in the predefined table, and in case the fixed value is to be signaled, one of the first and second number of bits represents a predefined pattern indicating that the fixed value is signaled, and the other one of the first and second number of bits indicates the fixed value.

In accordance with embodiments, the apparatus is a serving cell, the serving cell serving the UE, which entered into the predefined handover event, and the UE is not to break a connection with the serving cell during the handover procedure, and wherein the serving cell is to signal to the UE the adapted TTT using, e.g., an RRC configuration/reconfiguration message or any other form of signaling.

In accordance with embodiments, the serving cell is connected to the one or more neighboring cells via respective backhaul links, and the serving cell is to.

obtain via the respective backhaul links the channel conditions of the one or more neighboring cells, like signal strength, channel occupancy, load, and determine, using the channel conditions, whether or not to adapt the TTT, and, in case the TTT is to be adapted, signal the adapted TTT.

In accordance with embodiments, the apparatus is a UE, which entered into the predefined handover event, the UE is to make an autonomous decision on the adaption of the TTT based on the channel conditions of the one or more neighboring cells, like signal strength, channel occupancy, load.

In accordance with embodiments, for making the autonomous decision on the adaption of the TTT, the UE is to perform a downlink, DL, synchronization with the one or more neighboring cells, and to measure the channel condition, like the signal strength.

In accordance with embodiments, in case of a communication using one or more unlicensed bands or subbands, during the DL synchronization, the UE is to decode LBT information in addition to the channel condition, like the signal strength, to make the autonomous decision.

In accordance with embodiments, in case of a communication using one or more unlicensed bands or subbands, the UE is to receive LBT information from the one or more neighboring cells in a system information, e.g., in the physical broadcast channel, PBCH, or in the system information broadcast, SIB, channel, of the one or more neighboring cells.

In accordance with embodiments, the apparatus is to adapt the TTT responsive to a number of handovers reaching or exceeding a predefined threshold, or a time interval between a completed handover and another handover triggering event reaching of falling short of a predefined duration.

In accordance with embodiments, the apparatus is to configure the UE one or more channel condition thresholds, wherein an adaption of the TTT is selected based on the one or more channel condition thresholds.

The present invention provides an embodiment of an apparatus for a wireless communication system, wherein the wireless communication system comprises one or more UEs and a plurality of cells, and wherein a UE entering into a predefined handover event is to measure a channel condition, like the signal strength, of one or more neighboring cells for a predefined time, e.g., the time to trigger, TTT, and wherein the apparatus is to configure the UE with a plurality of TTTs and one or more channel condition thresholds, wherein a TTT is selected from the plurality of TTTs based on the one or more channel condition thresholds.

In accordance with embodiments, the apparatus is to provide a hierarchical TTT configuration, HiTTTCfg, the hierarchical TTT configuration being represented by at least two information elements, IEs, wherein different hierarchical TTT configurations may be provided for different neighboring cells, wherein the a cell may be intra-frequency or inter-frequency or intra-RAT or inter-RAT different, wherein a first IE indicates a hierarchical level, and wherein a second IE indicates the one or more channel condition thresholds.

In accordance with embodiments, the second IE indicates a minimum value and maximum value for the channel condition thresholds, or one or more values for channel condition thresholds.

In accordance with embodiments, the apparatus is to configure the UE in an RRC message before the onset of the handover preparation or during the handover preparation.

In accordance with embodiments, the handover is a conditional handover, and wherein, when entering into a predefined handover event, e.g., a conditional handover or a traditional handover, like the Release-15/legacy handover mechanism, a UE is to execute the handover in case one or more predefined conditions are satisfied over a certain period ($T_{CHO\_exec}$).

In accordance with embodiments, the TTT and a length or duration of the certain period ($T_{CHO\_exec}$) is set dependent on a mobility of the UE.

In accordance with embodiments, in case the mobility of the UE is below a first threshold, e.g., a low speed, the TTT is set to a first value and the length or duration of the certain period ($T_{CHO\_exec}$) is set to a second value, in case the mobility of the UE is above or at the first threshold, e.g., a medium or high speed, the TTT is set to a third value and the length or duration of the certain period ($T_{CHO\_exec}$) is set to a fourth value, and the first value is longer than the third value, and the second value is shorter than the fourth value.

In accordance with embodiments, the apparatus comprises one or more of: a UE comprising one or more of a mobile terminal, or stationary terminal, or cellular IoT-UE, or vehicular UE, or vehicular group leader (GL) UE, an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, e.g., a sensor or actuator, and/or a BS operating one or more cells, the BS comprising one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

User Device

The present invention provides an embodiment of a user device, UE, for a wireless communication system, wherein the wireless communication system comprises one or more UEs and a plurality of cells, and wherein the UE is to be served by a serving cell, wherein the UE, when entering into a predefined handover event, is not to break a connection with the serving cell during the handover procedure, and is to measure a channel condition, like the signal strength, of one or more neighboring cells for a predefined time, e.g., the time to trigger, TTT, and wherein the UE is to receive from the serving cell or another network entity an adapted TTT using, e.g., an RRC configuration/reconfiguration message or any other form of signaling, the adapted TTT based on channel conditions of the one or more neighboring cells.

In accordance with embodiments, the UE is configured, e.g., by the serving cell or another network entity, with a default TTT value, and is to select the default TTT or the adapted TTT based on one or more predefined characteristics of the target cell, like the cell-type of the target cell, the carrier of the target cell, and the access-type of the cell-type of the target cell.

In accordance with embodiments, the UE is to apply the default TTT for a communication using one or more licensed bands or subbands, and the UE is to apply the adapted TTT for a communication using one or more unlicensed bands or subbands, thereby compensating potential LBT failures in the one or more unlicensed bands or subbands.

In Accordance with Embodiments, the TTT is to be Adapted Responsive to a number of handovers reaching or exceeding a predefined threshold, or a time interval between a completed handover and another handover triggering event reaching of falling short of a predefined duration.

In accordance with embodiments, the UE is to be configured with one or more channel condition thresholds, and the UE is to extend the length of the TTT based on the threshold values.

The present invention provides an embodiment of a user device, UE, for a wireless communication system, wherein the wireless communication system comprises one or more UEs and a plurality of cells, and wherein the UE is to be served by a serving cell, wherein the UE, when entering into a predefined handover event, is to measure a channel condition, like the signal strength, of one or more neighboring cells for a predefined time, e.g., the time to trigger, TTT, and wherein the UE is to receive from the serving cell or another network entity a plurality of TTTs and one or more channel condition thresholds, and to select a TTT from the plurality of TTTs based on the one or more channel condition thresholds.

In accordance with embodiments, the UE is to receive from the serving cell or another network entity a plurality of TTT configurations, each TTT configuration including a plurality of TTTs and one or more channel condition thresholds, and In accordance with embodiments, the UE is to change from one configuration to another configuration based on the channel conditions.

In accordance with embodiments, the UE is an aerial vehicle or a drone, and is to change from one configuration to another configuration further based on one or more of a power saving criterium, a hovering altitude and a mobility speed.

In accordance with embodiments, the UE is to select a TTT or to scale a TTT based on the UE's altitude of operation, wherein a TTT for a higher altitude is shorter than a TTT for a lower altitude.

In accordance with embodiments, the handover is a conditional handover, and wherein, when entering into a predefined handover event, e.g., a conditional handover or a traditional handover, like the Release-15/legacy handover mechanism, the UE is to execute the handover in case one or more predefined conditions are satisfied over a certain period ($T_{CHO\_exec}$).

In accordance with embodiments, the TTT and a length or duration of the certain period ($T_{CHO\_exec}$) is set dependent on a mobility of the UE.

In accordance with embodiments, in case the mobility of the UE is below a first threshold, e.g., a low speed, the TTT is set to a first value and the length or duration of the certain period ($T_{CHO\_exec}$) is set to a second value, in case the mobility of the UE is above or at the first threshold, e.g., a medium or high speed, the TTT is set to a third value and the length or duration of the certain period ($T_{CHO\_exec}$) is set to a fourth value, and the first value is longer than the third value, and the second value is shorter than the fourth value.

The present invention provides an embodiment of a user device, UE, for a wireless communication system, wherein the wireless communication system comprises one or more UEs and a plurality of cells, wherein, when entering into a predefined handover event, e.g., a conditional handover or a traditional handover, like the Release-15/legacy handover mechanism, the UE is to execute the handover in case one or more predefined conditions are satisfied over a certain period ($T_{CHO\_exec}$).

In accordance with embodiments, the UE is to be configured with a timer ($T_{CHO\_exec}$), e.g., as a part of a conditional handover, CHO, configuration using an RRC message.

In accordance with embodiments, the UE is to check whether the one or more predefined conditions are satisfied and whether the one or more predefined conditions are sustained over the certain period ($T_{CHO\_exec}$), e.g., as indicated by the timer, and in case the one or more predefined conditions are sustained over the certain period, the UE is to continue to the handover execution.

In accordance with embodiments, the same value or different values are specified for the certain period ($T_{CHO\_exec}$) for the one or more neighboring cells, e.g., in a CHO configuration.

In accordance with embodiments, a length or duration of the certain period ($T_{CHO\_exec}$) is set dependent on one or more of the following:

a signal strength of the one or more neighboring cells,
an number of measurements the UE may perform,
a mobility of the UE, e.g., the length or duration of the certain period ($T_{CHO\_exec}$) is set to a first value in case the mobility of the UE is below a first threshold, e.g., a low speed, and wherein the length or duration of the certain period ($T_{CHO\_exec}$) is set to a second value in case the mobility of the UE is above or at the first threshold, e.g., a high speed, the first value being shorter than the second value.

In accordance with embodiments, the certain period ($T_{CHO\_exec}$) comprises a value indicating an absolute time or a number of averages to be considered.

In accordance with embodiments, the one or more predefined conditions to be satisfied within the certain period ($T_{CHO\_exec}$) comprises one or more of the following:
all UE measurements satisfy a predefined threshold or trigger value,
at most k UE measurements do not satisfy a predefined threshold or trigger value,
at least k UE measurements satisfy a predefined threshold or trigger value,
at least k UE measurements plus the last UE measurements satisfy a predefined threshold or trigger value,
at least k UE measurements plus the last n UE measurements satisfy a predefined threshold or trigger value,
an average, weighted or unweighted, of one or more UE measurements over the certain period ($T_{CHO\_exec}$) satisfies a predefined threshold or trigger value.

In accordance with embodiments, the UE comprises one or more of a mobile terminal, or stationary terminal, or cellular IoT-UE, or vehicular UE, or vehicular group leader (GL) UE, an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, e.g., a sensor or actuator.

System

The present invention provides an embodiment of a wireless communication system, comprising one or more UEs, and one or more cells, wherein one or more of the UEs comprises an apparatus o in accordance with the present invention or a UE in accordance with the present invention, and/or wherein one or more of the cells comprises an apparatus in accordance with the present invention.

Method

The present invention provides an embodiment of a method for operating a wireless communication system, wherein the wireless communication system comprises one or more UEs and a plurality of cells, and wherein a UE entering into a predefined handover event is to measure a channel condition of one or more neighboring cells for a predefined time, e.g., the time to trigger, TTT, the method comprising: adapting the TTT based on one or more channel conditions of the one or more neighboring cells.

The present invention provides an embodiment of a method for operating a wireless communication system, wherein the wireless communication system comprises one or more UEs and a plurality of cells, and wherein a UE entering into a predefined handover event is to measure a channel condition, like the signal strength, of one or more neighboring cells for a predefined time, e.g., the time to trigger, TTT, the method comprising: configuring the UE with a plurality of TTTs and one or more channel condition thresholds, wherein a TTT is selected from the plurality of TTTs based on the one or more channel condition thresholds.

The present invention provides an embodiment of a method for operating a wireless communication system, wherein the wireless communication system comprises one or more UEs and a plurality of cells, the method comprising: serving a UE by a serving cell, when entering into a predefined handover event, maintaining, by the UE, a connection with the serving cell during the handover procedure, measuring, by the UE, a channel condition, like the signal strength, of one or more neighboring cells for a predefined time, e.g., the time to trigger, TTT, and receiving, at the UE, from the serving cell or another network entity an adapted TTT using, e.g., an RRC configuration/reconfiguration message or any other form of signaling, the adapted TTT based on channel conditions of the one or more neighboring cells.

The present invention provides an embodiment of a method for operating a wireless communication system, wherein the wireless communication system comprises one or more UEs and a plurality of cells, the method comprising: serving a UE by a serving cell, when entering into a predefined handover event, measuring, by the UE, a channel condition, like the signal strength, of one or more neighboring cells for a predefined time, e.g., the time to trigger, TTT, and receiving, at the UE, from the serving cell or another network entity a plurality of TTTs and one or more channel condition thresholds, and selecting, by the UE, a TTT from the plurality of TTTs based on the one or more channel condition thresholds.

The present invention provides an embodiment of a method for operating a wireless communication system, wherein the wireless communication system comprises one or more UEs and a plurality of cells, the method comprising: serving a UE by a serving cell, when entering into a predefined handover event, e.g., a conditional handover or a traditional handover, like the Release-15/legacy handover mechanism, executing, by the UE, the handover in case one or more predefined conditions are satisfied over a certain period ($T_{CHO\_exec}$).

Computer Program Product

The present invention provides a computer program product comprising instructions which, when the program is executed by a computer, causes the computer to carry out one or more methods in accordance with the present invention.

Thus, the present invention provides improvements or enhancements for the handover process in a wireless communication system or network as described above, and embodiments of the present invention concern the time-to-trigger, TTT, during which a UE performs a measurement as well as improvements or enhancements for the conditional handover process.

In accordance with embodiments of the inventive approach, rather than sticking to a fixed TTT value, with which the UE may be configured, for example, using an RRC message, the TTT is made more flexible, for example, by extending the TTT or by providing different values for the TTT among the UE may select. Allowing the UE to operate on the basis of a TTT, either adapted to a certain value or having a value selected from a plurality of values, for example dependent on a channel condition at a neighboring cell, allows the UE to adapt the duration of its measurement to the actual channel condition so as to obtain measurement results which allow for a more accurate determination of the one or more neighboring cells to be used as a new serving cell. Thus, in accordance with embodiments of the present invention, the above-described problems found by the inventors with conventional handover procedures may be avoided. For example, providing the TTT, which is either extended or selected dependent on a channel condition, allows a UE to make a stable handover decision as the time during the measurement is sufficiently long to compensate fluctuating channel conditions between the UE and a gNB. For example, the UE, dependent on a certain situation, is given more time to perform a reliable measurement of the signal strengths so as to determine a strongest neighboring cell during the inventive TTT. Thereby, for example, impacts of a temporary blockage of the signal, of foliage losses, of coverage holes and the like onto the measurement may be reduced or even avoided.

In accordance with other embodiments of the inventive approach, in order to overcome the above mentioned issues regarding the CHO only momentarily satisfying a handover event, a certain period, also referred to as conditional handover execution period ($T_{CHO\_exec}$) is provided, e.g., as a part of a CHO configuration. The period may be a timer, and using the timer, the UE in addition to satisfying the handover like event, may also check if this event sustains over the period $T_{CHO\_exec}$. If so, the UE continues with the CHO execution. Employing the timer may reduce or avoid frequent handover attempts and may reduce the rate of handover failures, HOF(s).

Aspect 1

In accordance with embodiments of a first aspect of the present invention, a TTT extension is provided. To address the problem that a UE may not be in a position to make a measurement in situations as described above, for example due to bad channel conditions or due to a LBT failure, in accordance with embodiments of the first aspect the TTT for the UE may be extended. The above-mentioned bad channel conditions may occur in NR-systems and NR-U systems, and the above-mentioned LBT failure may occur in a NR-U system. In accordance with embodiments, the length of the extension of the TTT may be based on a signaling from the ServgNB or from the TargNB. The extension of the TTT may be long enough for a UE to obtain a meaningful measurement, but is not too long so as to avoid an increase in the power consumption and an increase in the MIT.

Thus, the problem may be considered to be analogous to a minimum-maximum optimization problem, in the sense that the TTT is extended by a minimum value to enable the UE with a fair chance to measure the strength of the one or more neighboring cells, however, the extension, on the other hand, is to be limited to a predefined maximum value. The maximum value for the TTT may be defined in the 3GPP specifications or may be specified in the ExTTTCfg.

In accordance with embodiments, the one or more channel conditions, dependent on which the TTT is adapted, may include one or more of:

a condition of physical time/frequency link between the UE and the one or more neighboring cells, e.g., the signal strength like the Reference Signal Received Power, RSRP, or the Reference Signal Received Quality, RSRQ, or the Signal to Interference plus Noise Ratio, SINR, or Channel State Information, CSI, a channel occupancy, band type, e.g. unlicensed or licensed, frequency range, e.g. FR1, FR2, or FR3, RAT type, e.g. GSM, UMTS, LTE, NR, . . .

SMTC/DMTC periodicity, results of an LBT procedure in case of a communication using one or more unlicensed bands or subbands.

In accordance with embodiments of the first aspect, a specific configuration for the TTT extension may be provided, which is referred to as extended TTT configuration, ExTTTCfg that may be represented by two information elements, IEs, as follows:

a first information element, IE_1, may indicate whether or not to extend the TTT. For example, the IE_1 may be signaled in a configuration using one bit so that a bit value of "0" indicates that there is no need to extend the TTT, while a bit value of "1" indicates that there is a need to extend the TTT, and a second information element, IE_2, may indicate, in case the TTT is to be extended, a minimum or maximum value of the TTT or a fixed value. The IE_2 may be represented by a plurality of bits.

In accordance with embodiments, different extension TTT configurations may be provided for different neighboring cells, wherein a cell may be intra-frequency or inter-frequency or intra-RAT or inter-RAT.

Figures 4, 5A, 5B, 6A, 6B:
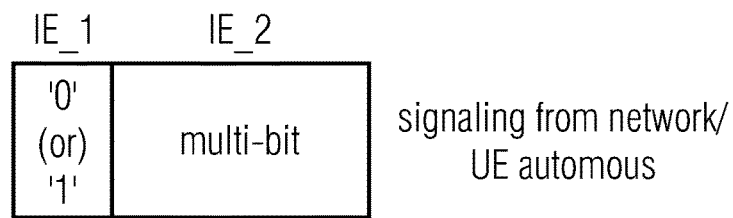
FIG. 4 illustrates an extended TTT configuration, ExTTTCfg, in accordance with embodiments of the present invention.

FIG. 4 illustrates an extended TTT configuration, ExTTTCfg, in accordance with embodiments of the present invention, the configuration includes the above-described information elements IE_1 and IE_2.

In case the IE_2 indicates the minimum value and the maximum value for the TTT to be used, in accordance with embodiments, based on a list of neighboring cells, which may be sorted in accordance with the signal strength, the channel occupancy or the load, that may be provided by one or more UEs, the network or the UE may configure the minimum value for the TTT based on the neighboring cell with the smallest SMTC or DMTC periodicity, and the maximum value may be based on the neighboring cell with the largest SMTC or DMTC. The minimum value may be any factor greater than or equal to the smallest SMTC or DMTC periodicity and less than or equal to the largest SMTC or DMTC periodicity.

For example, when assuming a UE having two neighboring cells, T1 and T2, the SMTC or DMTC periodicities may be referred to as T1_dmtc and T2_dmtc, and T2_dmtc=N·T1_dmtc (N≠1). In such a case, the minimum value for the TTT extension (MIN_TTT) may be MIN_TTT≥M*T1_dmtc but MIN_TTT≤T2_dmtc, i.e., M≤N (M≠1, N≠1). The maximum value for the TTT extension (MAX_TTT) may be greater than T2_dmtc, i.e., MAX_TTT>T2_dmtc. If both MAX_TTT and MIN_TTT are equal, this may reduce the signaling in the IE_2 to a single value, which may then be the same as the signaling of a single fixed value as described above in accordance with an embodiment for implementing the IE_2.

In case the IE_2 signals a single fixed value for the TTT extension, in accordance with embodiments, the network or the UE may configure such a single value for the TTT extension based on one or more of the following:

an average of the neighboring cell SMTC or DMTC periodicities, a maximum SMTC or DMTC periodicity among the neighboring cells, a minimum SMTC or DMTC periodicity among the neighboring cells, an additional time to recover for an LBT failure, in case the system operates in one or more unlicensed sub-bands.

In accordance with embodiments, the above-described IE_2 for the ExTTTCfg may indicate the minimum and maximum values for the TTT by explicitly signaling the minimum value and the maximum value or by signaling an index to a predefined table holding respective values for the minimum and maximum TTT. In accordance with other embodiments, an arbitrary value assignment for the min/max values may be used. For example, the arbitrary value may be a value within one or more ranges for the value as defined in a NR or 5G standard or specification. For example, in situations in which a UE may autonomously decide about the TTT extension, as shall be described in more detail below, the UE may chose a value for the IE_2 either by selecting values from the predefined table of the respective values or by receiving the actual values explicitly. The UE may also reuse a default or preconfigured value as setup by the network during the time the UE connection was active. The default or preconfigured value may be received at the UE using an RRC configuration/reconfiguration message or any other kind of signaling. The subsequently described IE_2 multi-bit design embodiments may be employed, for example, when signaling to a UE the ExTTTCfg, for example using an RRC configuration/reconfiguration message or any other suitable signaling message.

FIG. 5 illustrates an embodiment of a multi-bit design for the indication of the minimum value and the maximum value of a TTT. The IE_2 is a multi-bit value having X bits including a first number of bits and a second number of bits. The first number of bits may be referred to as the most significant bits, MSBs, and the second number of bits may be referred to as the least significant bits, LSBs, as is indicated in FIG. 5(a). The first and second number of bits may be the same, i.e., the MSB part and the LSB part have the same number of X/2 bits, however, in accordance with other embodiments, the number of bits may differ. In accordance with other embodiments, the first number of bits may be the least significant bits and the second number of bits may be the most significant bits as indicated in FIG. 5(b).

When the IE_2 indicates a minimum value or a maximum value for the TTT, based on the number of bits assigned to the IE_2, the LSBs may represent the minimum value, and the MSBs may represent the maximum value, and vice versa. For example, in case the IE_2 is a 16-bit representation, the lower 8-bits may be the minimum value, and the upper 8-bits may be the maximum value, or vice versa. In case the minimum/maximum values for the TTT are defined via an index to a predefined table, the lower and upper bits may represent an index in the predefined table of the possible TTT values. In case the minimum/maximum values are explicitly signaled, the lower and upper bits represent the actual value of the minimum value for the TTT or the maximum value for the TTT.

In accordance with further embodiments, the multi-bit design of FIG. 5 may also be employed for indicating the fixed value of the TTT that may be signaled using the IE_2. Thus, in case the IE_2 is a fixed value, all of the bits may be used to represent an index to a predefined table including possible values for the TTT value. For example, all X bits may be used to represent the index. In case the single value is explicitly signaled by the IE_2, the X bits may represent this single fixed value.

In accordance with other embodiments, the IE_2 may have a multi-bit design allowing for indicating both the minimum/maximum values and the single fixed value. FIG. 6 illustrates a multi-bit design for indicating both the min-max and single fixed values in accordance with an embodiment of the present invention. In a similar way as in FIG. 5, also in FIG. 6 a multi-bit representation including X bits is assumed for the IE_2 now including a predefined pattern XXX having a certain number of bits, for example X/2 bits. However, the pattern may be formed by more or less bits. The remaining bits are either the least significant bits or the most significant bits. The design or format of the IE_2 may be used for the communication of both the fixed single value and the min-max values within the same bit field. Other than in FIG. 5, in accordance with which the LSBs and the MSBs represent the min-max values, in accordance with embodiment of FIG. 6 either the LSBs or the MSBs represent a predefined pattern XXX which allows the UE to determine whether the IE_2 indicates a single fixed value or the min-max values. More specifically, a first predefined pattern may signal to the UE that the LSB (see FIG. 6(*a*)) or the MSB (see FIG. 6(*b*)) represents an index to a table holding possible values for the TTT, as described above. A different predefined pattern may signal to the UE that the LSB or MSB holds an actual fixed value to be used for the TTT.

In accordance with embodiments, the setup or configuration of the ExTTTCfg may be network-controlled, for example by providing a signaling from a network entity, like the gNB, it may be UE-autonomous or preconfigured, or it may be cell/carrier/access-type specific, or it may be dynamic. In the following, embodiments for the above scenarios will be described in more detail. In accordance with other embodiments the configuration of the ExTTTCfg may be sidelink-indicated, i.e., may be signaled from another UE.

Scenario 1—Centralized Control (Network-Controlled)

Figure 7:
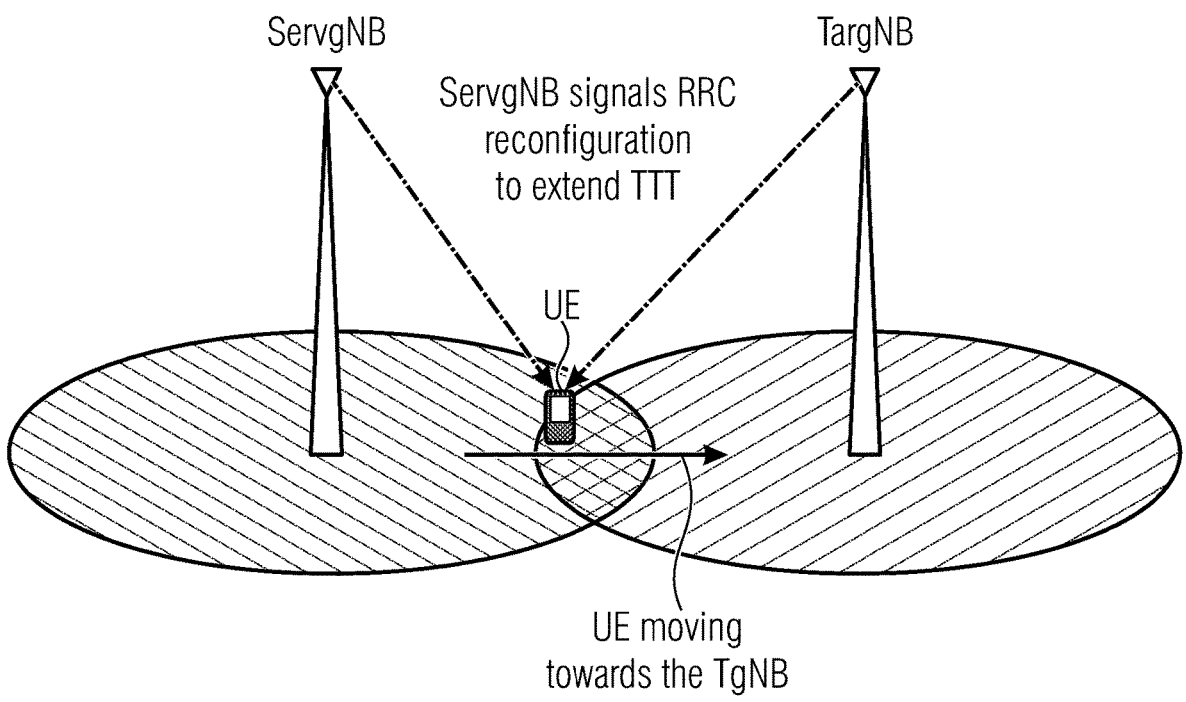
FIG. 7 illustrates a part of a wireless system a serving cell and a target cell towards which a UE is moving.

FIG. 7 illustrates a part of a wireless system as described above including a first cell including the serving base station ServgNB to which the UE is currently connected, however, the UE is moving towards the target cell including the target base station TargNB. In this scenario, it is assumed that the connection of the UE ServgNB is active during the handover so that in accordance with this embodiment the ServgNB may signal an RRC reconfiguration towards the UE for extending the TTT. The scenario depicted in FIG. 7 may be in accordance with the Release-15 MBB procedure, i.e., the UE does not break the connection from the ServgNB during the handover procedure. In accordance with this embodiment, the ServgNB signals the ExTTTCfg. The ServgNB may be aware of the channel conditions of the one or more neighboring cells, both for NR-systems and NR-U systems and/or of the LBT results in case of NR-U systems. The channel conditions may be communicated among the cells over the backhaul links. On the basis of the information about the channel condition and the LBTs, if any, the ServgNB may decide whether it is useful or not to extend the TTT. For example, in case the channel condition indicates that it is unlikely that a reliable measurement from a certain cell is to be achieved by the UE during the handover process, the ServgNB may signal in the ExTTTCfg information element IE_1 that there is a need to extend the TTT and may include into the information element IE_2 the minimum value or the maximum value for the TTT or a fixed value for the TTT as described above. The signaling of the ExTTTCfg may be in an RRC configuration/reconfiguration message or it may be provided to the UE using another form of signaling.

In the embodiment described with reference to FIG. 7, a network-based decision is made in terms of both the need for the extension of the TTT and, if needed, the length of the TTT extension. With the combined knowledge of the channel condition, like the signal strength, and, if an NR-U system is involved, the LBT results, from the one or more neighboring cells, the network may decide about the need to extend the TTT and, if needed, the length of the TTT extension. In accordance with embodiments, a minimum amount of signaling exchange may occur between the UE and the gNB, and the signaling may be limited to the RRC configuration/reconfiguration, which is already part of an existing signaling protocol during handover. The additional signaling may only involve the addition of the ExTTTCfg so that, in accordance with this embodiment, the UE, in case of an NR-U system, needs not to be aware of the result of the LBT as this is obtained by the ServgNB via the backhaul links. In addition, in accordance with this embodiment, since the bandwidth of the backhaul links is quite large, the addition of the LBT results and the channel conditions from the one or more neighboring cells does not put any burden on to the link between the UE and the gNB.

Figure 8:
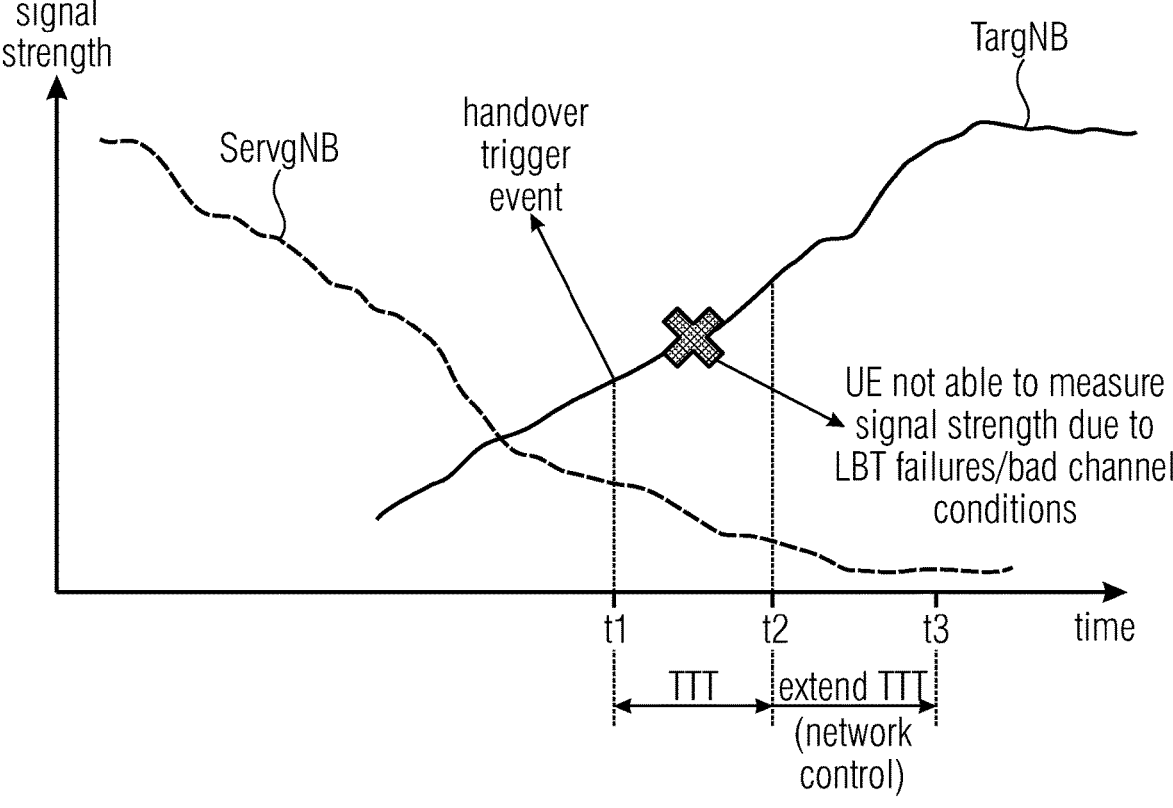
FIG. 8 illustrates a handover in a network-controlled embodiment as described above with reference to FIG. 7.

FIG. 8 illustrates a handover in a network-controlled embodiment as described above with reference to FIG. 7. FIG. 8 illustrates the signal strength versus time (=distance) when the UE is connected to the ServgNB in FIG. 7. When assuming a movement of the UE as it is indicated in FIG. 7, initially, at the right hand part of the diagram in FIG. 8, the signal strength is quite high, however, the further the UE moves away from the ServgNB, the lower the signal strengths becomes. The UE also monitors the signal strength of the TargNB, i.e., a neighboring cell, and once the UE determines that the signal strength of a signal from the ServgNB is below a certain threshold and a signal strength from the TargNB is above a certain threshold, as is indicated at t1, a handover trigger even is recognized so that the UE initiates a handover procedure, for example the MBB procedure described above. The UE stays connected to the ServgNB. In accordance with embodiment employing the network-controlled TTT extension, the ServgNB may derive from the TargNB, for example via the backhaul link, the current channel condition and, in case of NR-U, also an LBT result so as to decide as to whether the currently configured TTT in the UE is sufficient for providing a meaningful measurement report on the basis of which the actual handover is then decided. In the example of FIG. 8, it is assumed that the ServgNB determines that the currently configured TTT between instances t1 and t2, e.g., a default TTT, is not sufficient and, therefore, signals to the UE that a TTT extension is needed. In accordance with the depicted embodiment, a fixed value for the extension is signaled so that the TTT now extends from t1 to t3 giving the UE sufficient time to measure the signal strength from the TargNB, thereby providing a meaningful measurement report on the basis of which, a handover may be decided.

In accordance with other embodiments, the ServgNB may also signal a minimum value for extending the TTT, i.e., a minimum length, or a maximum length by which the TTT originally configured may be extended and the UE may select a value for extending the TTT which is between the minimum and maximum value for extending the initial TTT to a period beyond t2.

Scenario 2—Decentralized Control (UE-Autonomous)

In accordance with further embodiments, the TTT extension may be implemented by a decentralized control, i.e., may be UE autonomous. In accordance with such embodiments, the UE autonomously decides whether to extend the TTT or not. The UE may make an autonomous decision on the extension of the TTT based on the information of the LBT, in case of an NR-U system, and/or based on the measured signal strengths, in case of an NR- or NR-U system, from the one or more neighboring cells.

In case of a NR-U system, the UE needs to be aware of the LBT information from the one or more neighboring cells, and to provide this information the UE, in accordance with embodiments, the LBT results may be signaled in the system information, for example in the physical broadcast channel, PBCH, or in the system information broadcast, SIB, channel, of the one or more neighboring cells. The UE may perform a downlink, DL, synchronization with the one or more neighboring cells and may measure the signal strength so as to make an autonomous decision on whether an extension of the TTT is needed or not. In a NR-U system, during the DL synchronization, the UE may further decode the LBT result in addition to the signal strength to make the autonomous decision.

In accordance with this embodiment, the UE may autonomously decide whether the extension of the TTT is needed and also about the length of the extension based on the above-mentioned information from the one or more neighboring cells, like the signal strengths and/or the LBT result. When compared to the network-controlled embodiment described above, the UE needs to decode or obtain the signal strength and/or LBT result from all of the neighboring cells. To reduce the signaling overhead, in accordance with embodiments, the UE may decode the LBT result only from a strongest of the neighboring cells thereby reducing the UE side processing. In case the LBT result information, in a NR-U system, is embedded in the system information broadcast messages, the signaling overhead may also be reduced.

Figures 9, 10:
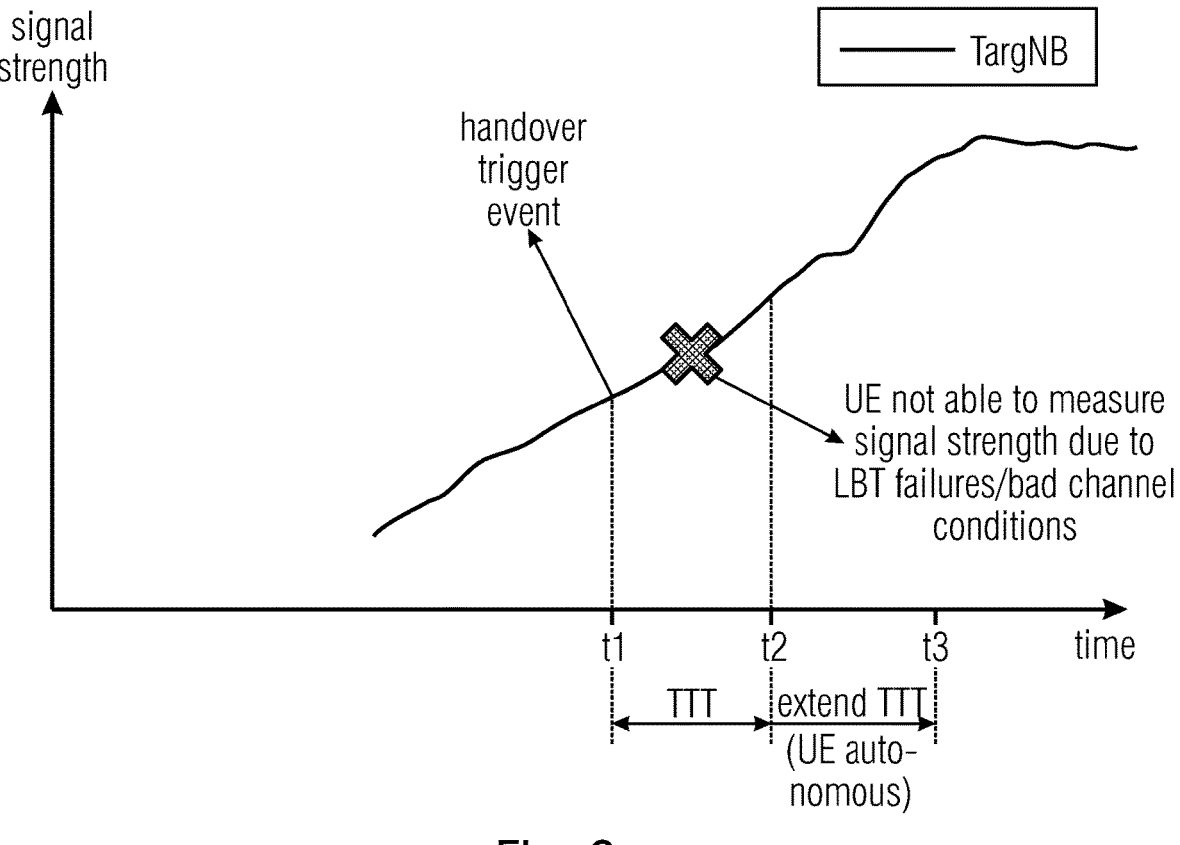
FIG. 9 illustrates an embodiment using a UE autonomous control of the TTT extension.
FIG. 10 illustrates an embodiment of the hierarchical TTT configuration, HiTTTCfg, in accordance with embodiments of the present invention.

FIG. 9 illustrates, in a similar way as in FIG. 8 the TTT extension in accordance with the above-described embodiment using a UE autonomous control of the TTT extension. The UE receives the signal strength from the TargNB and at time t1, the signal strength is at a level triggering a handover, i.e., the TargNB is considered a potential candidate to which the UE may connect, e.g., in case the cannel condition further deteriorates. The UE may be determine that the measurement period as defined by the initial or default TTT having a duration from t1 to t2 is not sufficient for obtaining a meaningful measurement so as decide further about the handover. Therefore, in a similar was as described above, on the basis of the information now obtained by the UE itself, an extension of the TTT until t3 may be decided so as to obtain a suitable measurement result. Again, the extension may be a fixed value or may be a value selected by the UE between a minimum and a maximum value.

Scenario 3—Cell/Carrier/Access-Type Specific Control

In accordance with yet further embodiments, the decision as to whether the TTT is to be extended or not, and if extended, the length of the TTT extension, may be performed implicitly dependent on certain parameters of the wireless communication system, like the cell type, the carrier type or the access type. In accordance with this embodiment, the network may configure the UE with a default TTT value and, in addition, with the TTT extension, e.g., the UE may be configured with additional TTT values being longer than the default TTT value. The UE may choose the TTT to apply based on the cell-type of the target gNB, for example based on the band used by the gNB which may be a licensed band or an unlicensed band. For example, the UE may apply the default TTT when operating in the licensed bands, while applying an extended TTT when operating in the unlicensed bands so as to provide for a compensation for potential LBT failures.

Scenario 4—Dynamic Control

In accordance with yet further embodiments, the TTT may be adapted dynamically. For example, in case frequent handovers are detected, i.e., a number of handovers exceeds a certain threshold, or in case a new handover is triggered soon after a last handover was performed, for example in case the time interval between two handovers is below a predefined threshold, the TTT may be changed or adapted. Aspect 2

In accordance with a second aspect of the present invention, a hierarchical TTT extension is provided. To reduce the number of or to avoid frequent or late triggering of the MR and to improve the consistency of a signal strength report, e.g., in case of all high mobility UE(s) like UAV(s) or drones, a hierarchical TTT extension of the measurement of all neighboring cells is implemented which is based either on a single threshold value or on a threshold range including a number of thresholds.

In accordance with embodiments there may be different levels of hierarchy based on the design of the threshold. The corresponding TTT parameter may be already part of the current RRC configuration, and to implement the hierarchical extension, in accordance with embodiments a list of configured TTT values is included into the existing RRC configuration.

In accordance with embodiments, the hierarchical TTT configuration, HiTTTCfg, may be represented by two information elements. A first information element, IE_1, may indicate the hierarchical level, for example by using k-bits, so that the level may be indicated as level=$2^k$. In accordance with other embodiments, the IE_1 may indicate the actual value of the level which may be represented by k-bits. The second information element, IE_2, may include one or more threshold values or a range of thresholds. In accordance with embodiments, a minimum value and a maximum value for the threshold values may be indicated so as to allow the UE selecting a value for the threshold being the minimum or maximum value or any value therebetween. In accordance with other embodiments, the IE_2 may explicitly signal one or more values, for example, a single value if k=0, or a list of values if k>0.

In accordance with embodiments, different hierarchical TTT configurations may be provided for different neighboring cells, wherein a cell may be intra-frequency or inter-frequency or intra-RAT or inter-RAT.

FIG. 10 illustrates an embodiment of the hierarchical TTT configuration, HiTTTCfg, in accordance with embodiments of the present invention. The hierarchical TTT configuration includes the above-described information elements IE_1 and IE_2 and may be signaled either by the network to the UE, or may be UE-autonomous. In accordance with other embodiments the hierarchical TTT configuration may be sidelink-indicated, i.e., may be signaled from another UE.

As mentioned above, in accordance with embodiments, the existing RRC configuration may be extended by a list of configured TTT values from which the UE may select in case a threshold, as signaled by the hierarchical TTT configuration, is reached or exceeded. FIG. 11 illustrates an example of a modified existing Timed-To-Trigger IE including the hierarchical TTT configuration list, HiTTTList, including a number of TTT values HiTTT_(k).

In accordance with the second aspect of the present invention, in case one or more thresholds are signaled by the hierarchical TTT configuration, in case the UE determines a channel condition, like the signal strength, to be below a certain threshold, the UE may select from the hierarchical TTT configuration list a TTT value that is extended when compared to default TTT value so as to allow the UE to make a measurement over a longer period of time so as to improve the measurement report used during the handover process.

The setup of the HiTTTCfg and TTT configuration list may be network-indicated, for example by signaling from a network entity, like a gNB, or it may be UE autonomous.

The network-indicated signaling, for example, from the gNB, may be semi-static in time and may configure the HiTTTCfg and the TTT list using an RRC message, like a measurement configuration, before the start or onset of or during the handover procedure, or, more specifically the handover preparation stage. In accordance with further embodiments, the gNB may signal the number of levels and the corresponding threshold values or the range of thresholds. As described above with reference to FIG. 10, the minimum or maximum value of the threshold may be signaled together with the hierarchical level so that the UE may choose a value for the threshold that is the minimum value, the maximum value or a value between the minimum and maximum values. The decision about the threshold to be used may be based on a current channel condition, for example it may be based on a current signal level or an interference level the UE experiences with regard to the one or more neighboring cells.

In accordance with other embodiments, as mentioned above, the IE_2 may signal a single value or a list of values for the thresholds, dependent on the hierarchical level, from which the UE may select the threshold to be applied.

In accordance with embodiments, the hierarchical TTT extension is advantageous for improving the consistency of the measurement reports for unmanned aerial vehicles or drones. Since the channel properties of drones may change significantly with altitude, the parameters of the HiTTTCfg/ TTT list may be variable with the altitude and/or their mobility speed of the drone. In accordance with such embodiments, the drone is to signal its current altitude and/or speed to the gNB. When considering a UE autonomous case, the UE, for example a drone, may freely choose the hierarchy level, the corresponding threshold values and the TTT list based on current channel conditions. The autonomous case is more dynamic than the network-controlled case so that UEs, like drones, may quickly change the configuration based on the current channel conditions, the altitude, the mobility state, which may provide for significant power savings.

In both the network-indicated case and the UE autonomous case, the length of the TTT extension or the hierarchically larger TTT value is any value less than the indicated maximum configured or preconfigured values. The configured or preconfigured values may serve as a guide for the UE to select the TTT.

Figure 12:
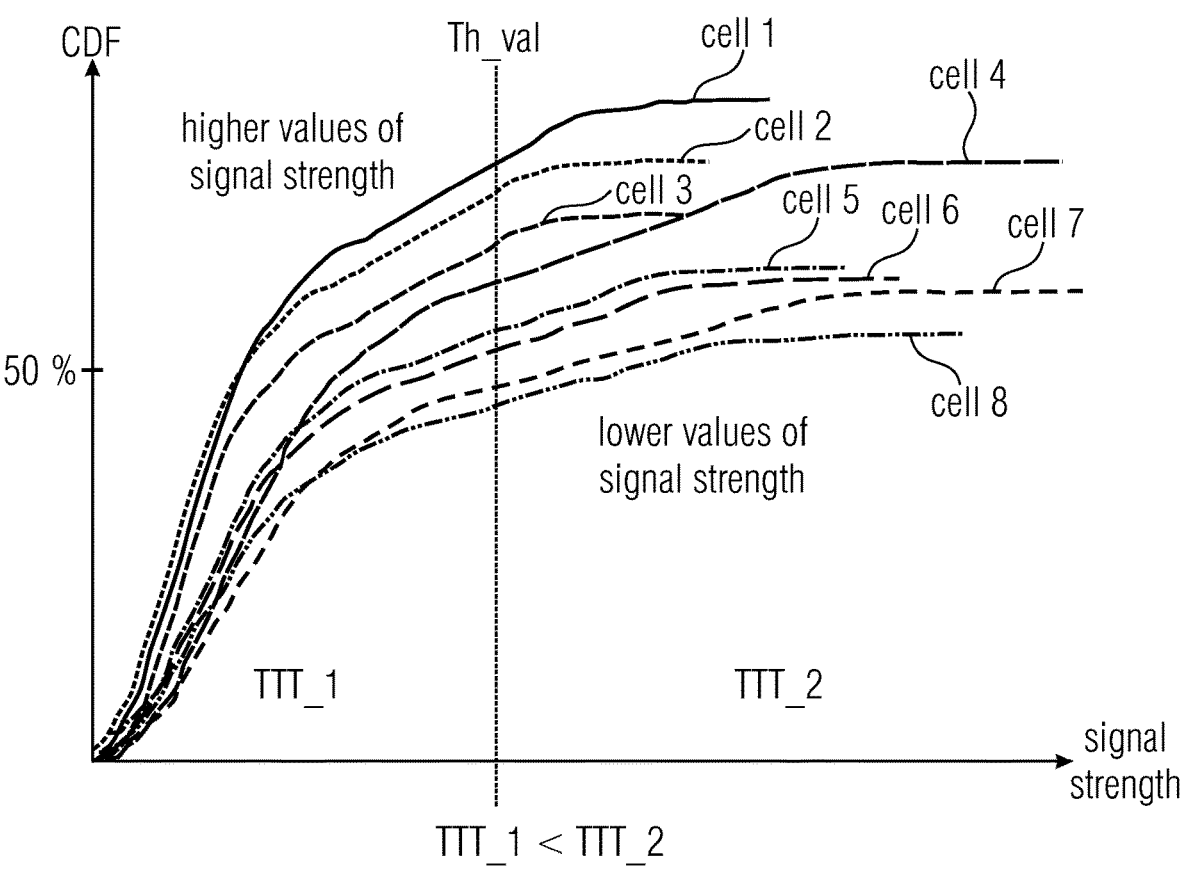
FIG. 12 illustrates an example of the cumulative distribution function (CDF) of the signal strengths of eight neighboring cells a drone may see due to its movement at higher elevations when compared to terrestrial UEs using one signal strength threshold.

FIG. 12 illustrates an example of the cumulative distribution function (CDF) of the signal strengths of eight neighboring cells a drone may see due to its movement at higher elevations when compared to terrestrial UEs. FIG. 12 illustrates a first TTT value TTT_1 having a first duration and a second TTT value TTT_2 having a second duration, and TTT_1 is shorter than TTT_2. FIG. 12 also illustrates a threshold Th_val and in this embodiment it is assumed that the hierarchical TTT extension indicates a level of k=1 and provides the threshold value Th_val. The drone may see a stronger signal strength at higher altitudes due to a lesser number of obstacles so that, as long as the drone is at or above a certain altitude, the shorter TTT_1 may be used, while at lower altitudes, where more obstacles result in lower values of the signal strength, the longer TTT_2 may be employed.

Figure 13:
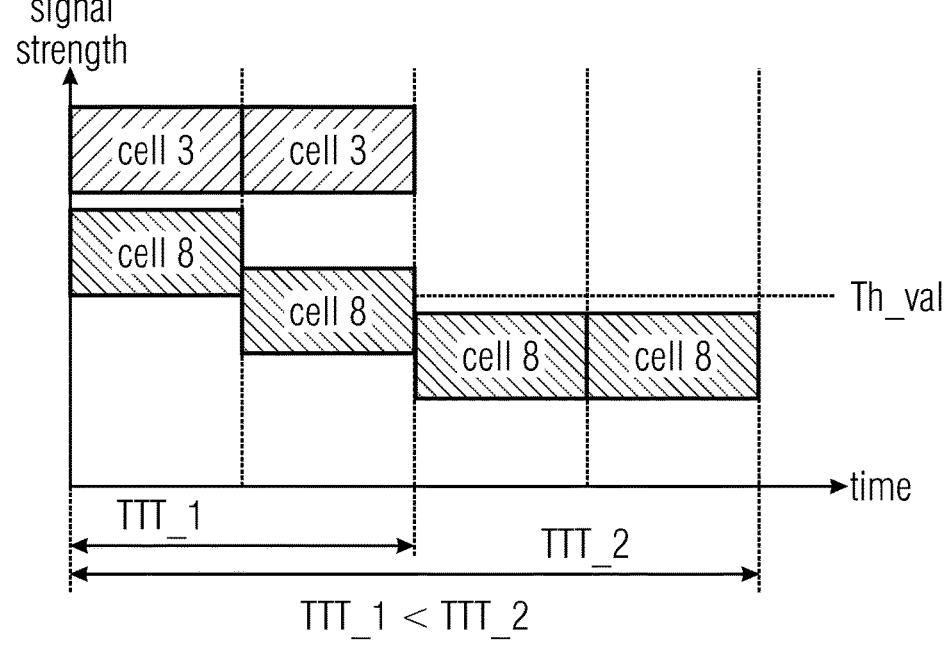
FIG. 13 shows an embodiment using a single value threshold with a hierarchy level of two.

FIG. 13 shows an embodiment using a single value threshold with a hierarchy level of two. As is shown in FIG. 13, if a single value threshold Th_val is used, two TTT values, TTT_1 and TTT_2 may be configured, wherein TTT_1 is shorter than TTT_2. In case the signal strength of a cell X is above Th_val over the period of the shorter TTT, TTT_1, the TTT may be extended based on an autonomous decision by the UE. The length of the extension may be less than or equal to the remaining length of the difference between the first TTT_1 and the second TTT_2. In FIG. 13, cell 3 is assumed to have a signal strength over the threshold Th_val during the TTT_1, so that at the end of TTT_1, cell 3 is added to the triggered cell list. On the other hand, cell 8 is not above the threshold for the entire period of TTT_1 so the TTT is extended to TTT_2 as is depicted in FIG. 13 so as to obtain the desired measurement report and to allow adding also cell 8 to the triggered cell list.

This principle may be considered analogous to the principle described above with regard to the first aspect in which a minimum/maximum value for the TTT is configured using the ExTTTCfg.

Figure 14:
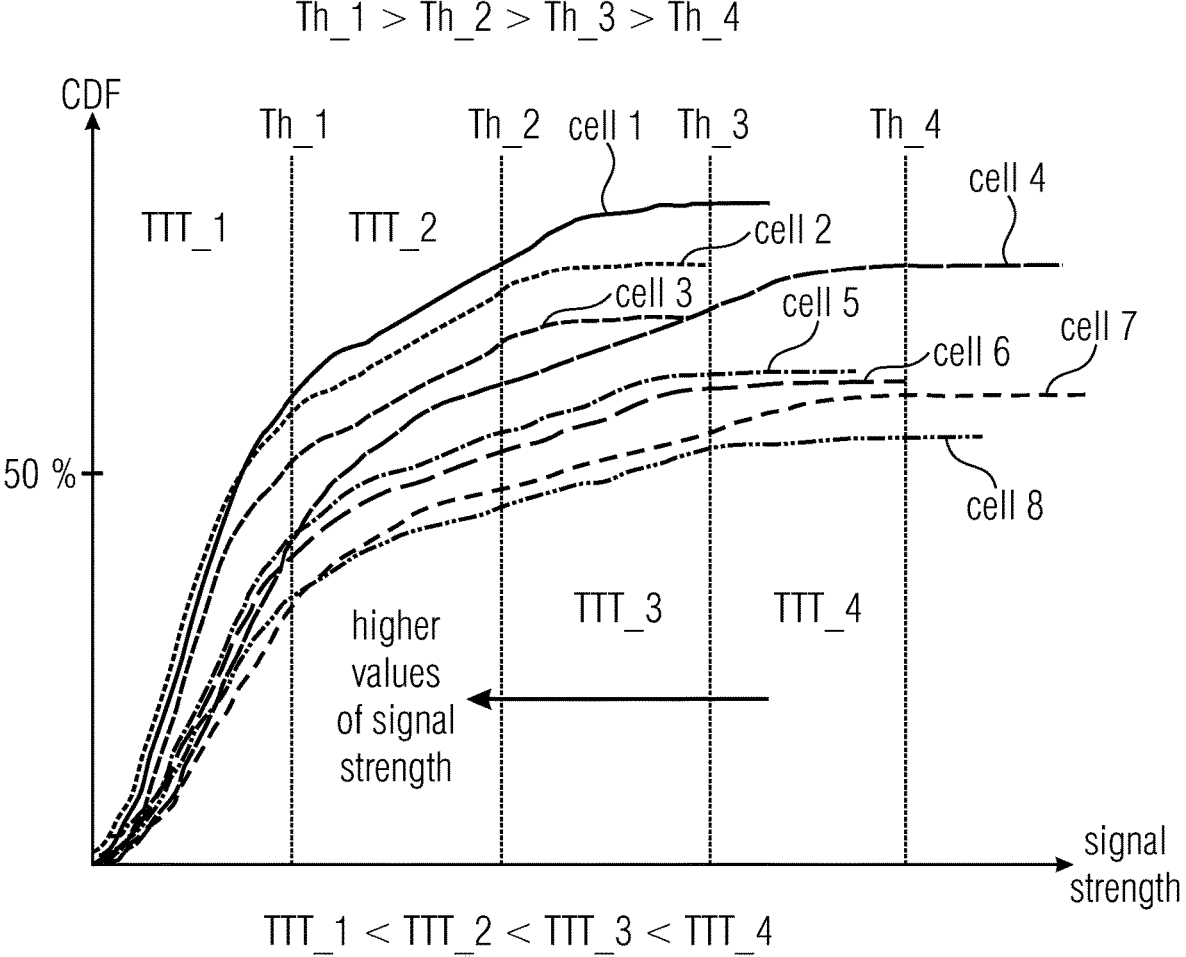
FIG. 14 illustrates an example of the CDF of the signal strength of eight neighboring cells a drone may see due to its movement at higher elevations when compared to terrestrial UEs using multiple signal strength thresholds.

As described above, in accordance with other embodiments, more than one threshold may be employed, and FIG. 14 illustrates an embodiment using multiple thresholds. FIG. 14, in a similar way as FIG. 12, illustrates the CDF of the signal strength of neighboring cells, more specifically of eight neighboring cells. Again, it is assumed that the UE is a drone that sees higher or stronger signal strengths when traveling at higher altitudes owing to the lesser number of obstacles. In FIG. 14, four thresholds TH_1 to TH_4 are assumed of which threshold TH_1 is greater than threshold TH_2 which is greater than threshold TH_3 which is greater than threshold TH_4. Thus, in the example depicted in FIG. 14, four different altitude ranges in which the drone travels may be distinguished by the respective thresholds, and with a decrease in altitude, the values of signal strengths drop, so that once a threshold for a signal strength is reached, the TTT may be changed, from an initial short TTT_1 to the longer TTT_2, TTT_3 or TTT_4. Thus, FIG. 14 illustrates an example using four levels of hierarchy, and the extension may occur on multiple levels over a longer period. For example, the UE may autonomously choose to extend to a maximum TTT_4, to a minimum TTT_1 or an intermediate TTT_2 or TTT_3. The extension to any one of k levels is also possible. The higher the resolution (the higher the number of levels), the more consistency in the signal strength reporting and a lower frequency of reporting may be achieved. In addition, in accordance with existing 3GPP agreements, the hierarchical approach provides higher power savings because, due to the fact that the UE or drone sees a larger number of cells, a minimum number of the neighboring may satisfy a high or medium signal strength, at least on average, thereby preventing that large values of TTT are to be used.

Figure 15:
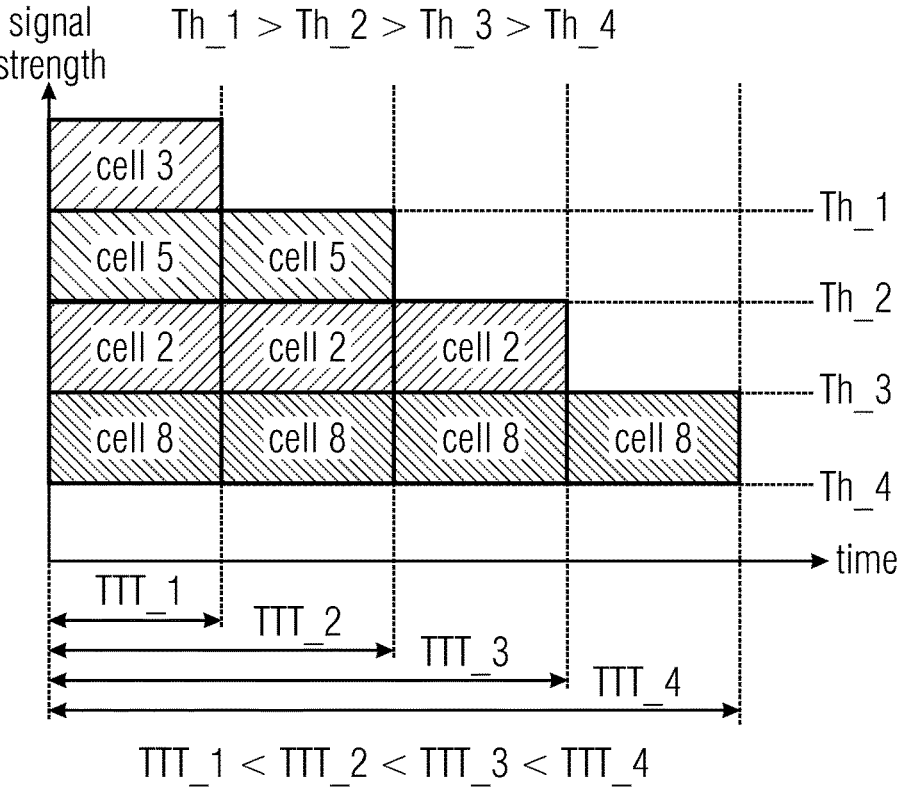
FIG. 15 illustrates an example using a range of thresholds with a hierarchy level of 4 which allows configuring four values for the TTT for cells having a similar configuration.

FIG. 15 illustrates an example using a range of thresholds with a hierarchy level of 4 which allows configuring four values for the TTT, as described with reference to FIG. 14, namely TTT_1 to TTT_4 having increasing lengths. In FIG. 15 it is assumed that all cells have the same or similar configurations, e.g., the frequency of operation of the one or more cells, the cell type, the SMTC or DMTC periodicity or other factors may be the same or similar. In case the signal strength of a cell X is above a certain signal strength threshold, the TTT associated with the threshold will be applied. In the example of FIG. 15, the signal for cell 3 is above threshold TH_1 so that TTT_1, which may be shortest TTT or the default TTT, is employed for the measurement of cell 3. The signal strength of cell 5 is below threshold TH_1 but above threshold TH_2 so that the TTT associated with threshold TH_2, namely TTT_2, which is longer than TTT_1 or the default TTT, is employed for measurements from cell 5. For cell 2 and for cell 8 the signal strength is above threshold TH_3 but below threshold TH_2, and above threshold TH_4 but below threshold TH_3, respectively, so that the associated TTTs, namely TTT_3 or TTT_4 are applied for the measurement of these cells.

Figure 16:
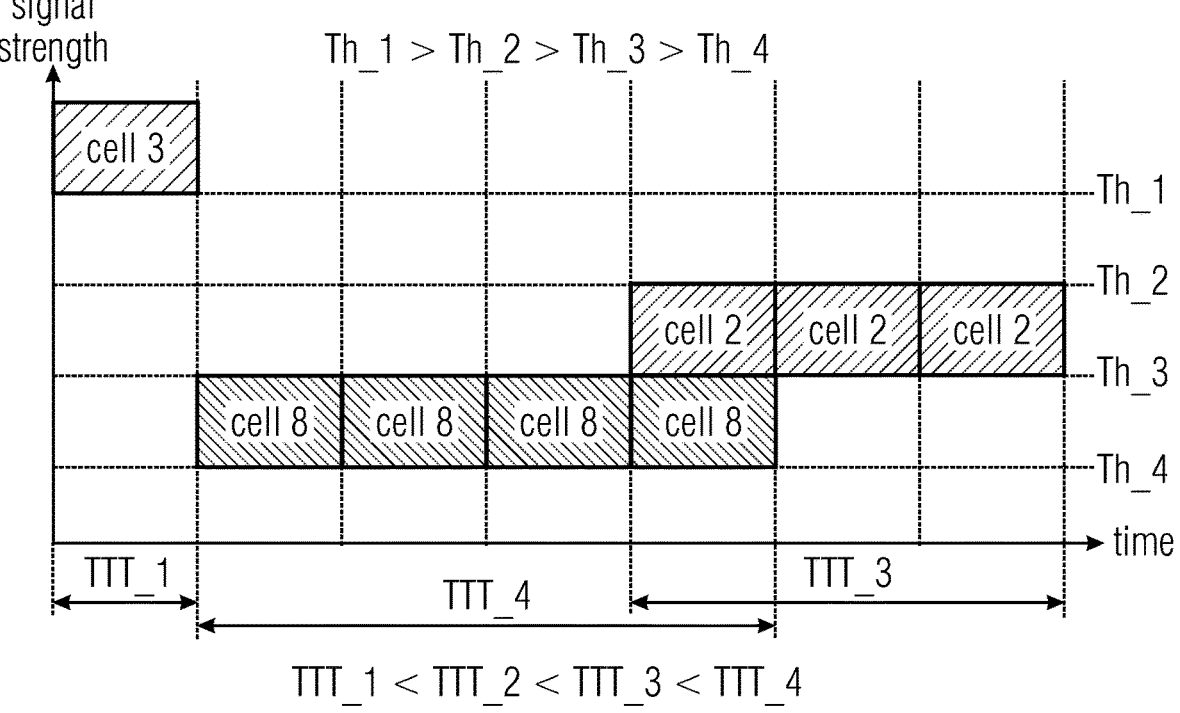
FIG. 16 illustrates an example using a range of thresholds with a hierarchy level of 4 which allows configuring four values for the TTT for cells having different configurations.

FIG. 16 illustrates an example similar to FIG. 15, however, other than in FIG. 15, the respective neighboring cells have different configurations, e.g., the frequency of operation of the one or more cells, the cell type, the SMTC or DMTC periodicity or other factors may be different. In FIG. 16 the measurement of the cells does not start at the same time but at different times. FIG. 16 illustrates cell 3 having a signal strength above threshold TH_1 so that TTT_1, which may be the shortest TTT or the default TTT, is employed for the measurement of cell 3. No measurements are performed for cell 5. The measurement of cell 2 starts later than the measurement of cell 3, and the signal strength is above threshold TH_3 but below threshold TH_2, so that TTT_3 is used for the measurement of cell 2. The measurement of cell 8 starts later than the measurement of cell 3 but earlier than the measurement of cell 2, and the signal strength is above threshold TH_4 but below threshold TH_3 so that TTT_4 is applied for the measurement of cell8.

Figure 17A:
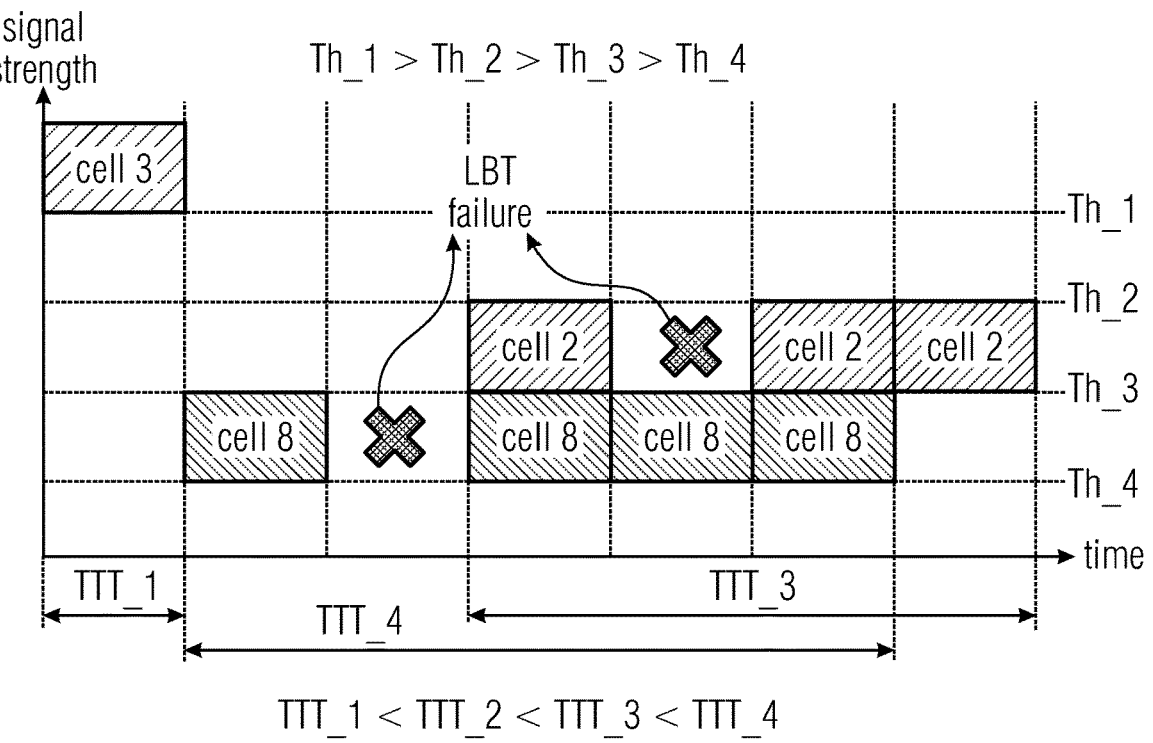
FIGS. 17(*a*)-17(*b*) illustrate the impact of LBT failures in NR-U systems on the TTT and how it may be avoided or reduced according to embodiments of the present invention.
Figure 17B:
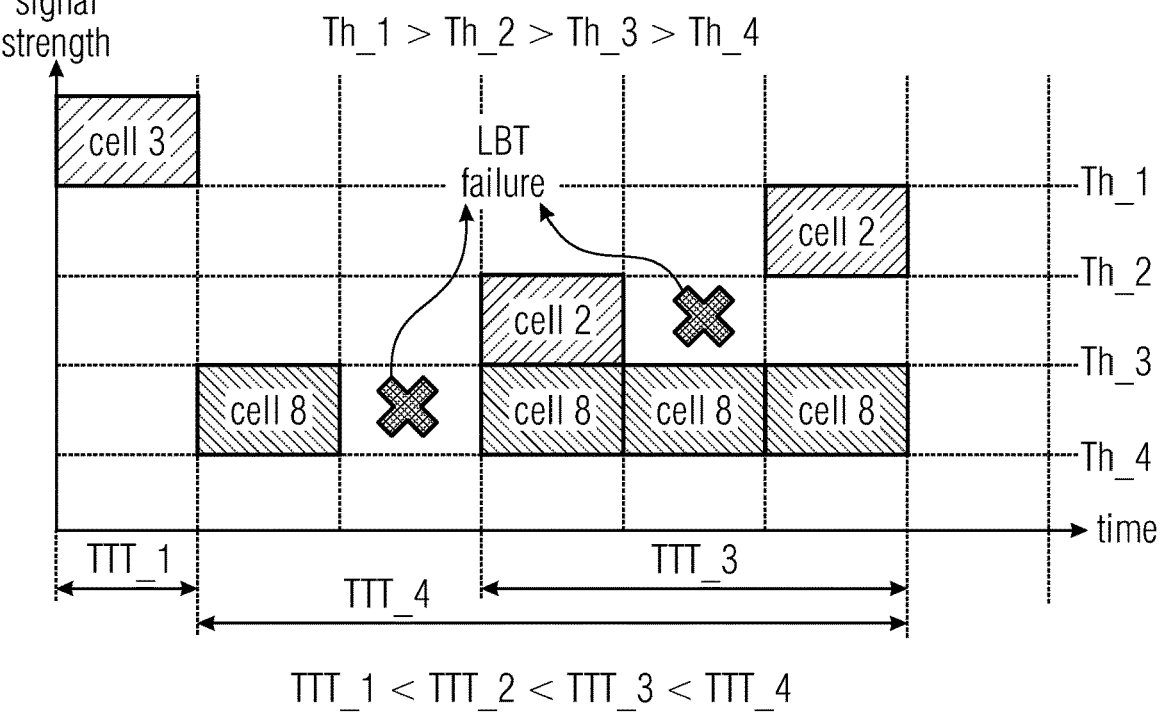

FIG. 17(*a*) and FIG. 17(*b*) illustrate the impact of LBT failures in NR-U systems on the TTT. FIG. 17 illustrates the cells 2, 3 and 8 as in FIG. 16, however, cells 2 and 8 operate at least partially in the unlicensed spectrum. In FIG. 17(*a*) respective LBT failures in cells 2 and 8 are illustrated by x. For example, one or more or all of the subbands used in cells 2 and 8 may be occupied so that there is no transmission and no measurements the UE may perform. As may be seen from FIG. 17, extending the TTT allows coping with such LBT failures because dur to the extended TTT meaningful measurement results may also be obtains from such cells. FIG. 17(*b*) illustrates a situation in which, after an LBT in cell 2, the signal strength increases again, above Th_2, e.g., because after the LBT at a later time at least some of the occupied subbands may be available again.

In accordance with further embodiments, the network-based configuration of the extension of the TTT may take into account the cell planning or other network parameters, and a UE may make a decision on the thresholds based on an overall signal strength or an overall interference from neighboring cells.

In accordance with embodiments, the above-described change in the length of the configured TTT (aspect 1) or the change in the TTT extension (aspect 2), for example in case of non-terrestrial user devices, like a drone, may be selected dependent on the altitude of the operation. For higher altitudes, a shorter TTT extension may be provided since there are more LOS opportunities. From a network-controlled perspective, the gNB may signal a fixed scaling value for scaling a default or initial TTT dependent on the altitude. In such an embodiment, the UE may signal the altitude to the gNB. For example, a scaling value may be based on a currently estimated altitude of the drone or UE.

In accordance with other embodiments, the second aspect concerning the hierarchical TTT extension may be used together with the first aspect of the TTT extension. The hierarchical TTT extension may be considered a kind of extrapolation of the TTT extension so that, in accordance with further embodiments, the user device may be configured with a single TTT, like the default TTT, and the UE may choose to extend the length of the TTT in accordance with the first aspect of the present invention, however, the actual lengths may be decided dependent on the signal strength with regard to one or more signal strength threshold values. The maximum length of the extension may be limited to the highest value of the TTT as allowed by the standards. The UE may choose the threshold values based on perceived channel conditions and interference and, in case of network controlled approaches, the gNB may signal only a configured TTT value and the maximum length of extension, which may be less than the highest value as allowed by the standard. Respective threshold values may be chosen by the UE so as to select an actual length of the extension to be less than the maximum length of the extension. In another embodiment, the gNB may also signal the threshold values, for example, based on network planning parameters.

Aspect 3

Figure 18A:
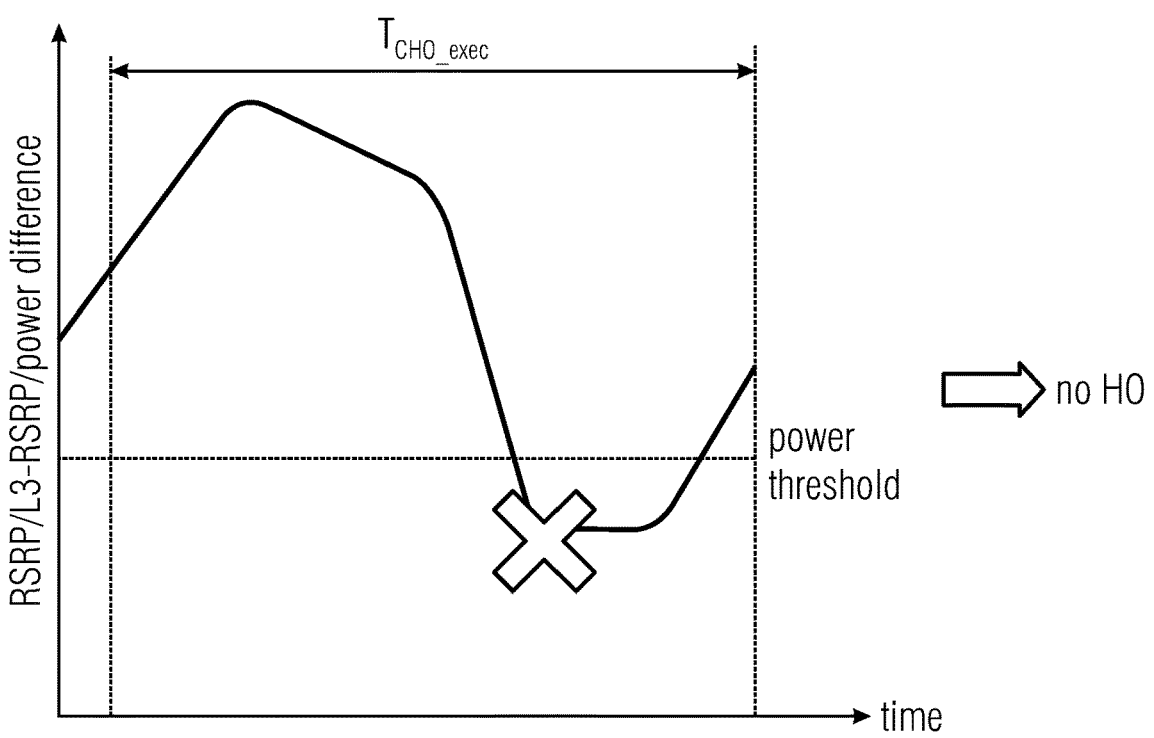
FIGS. 18(*a*)-18(*b*) illustrate an embodiment using the conditional handover execution period, $T_{CHO\_exec}$.
Figure 18B:
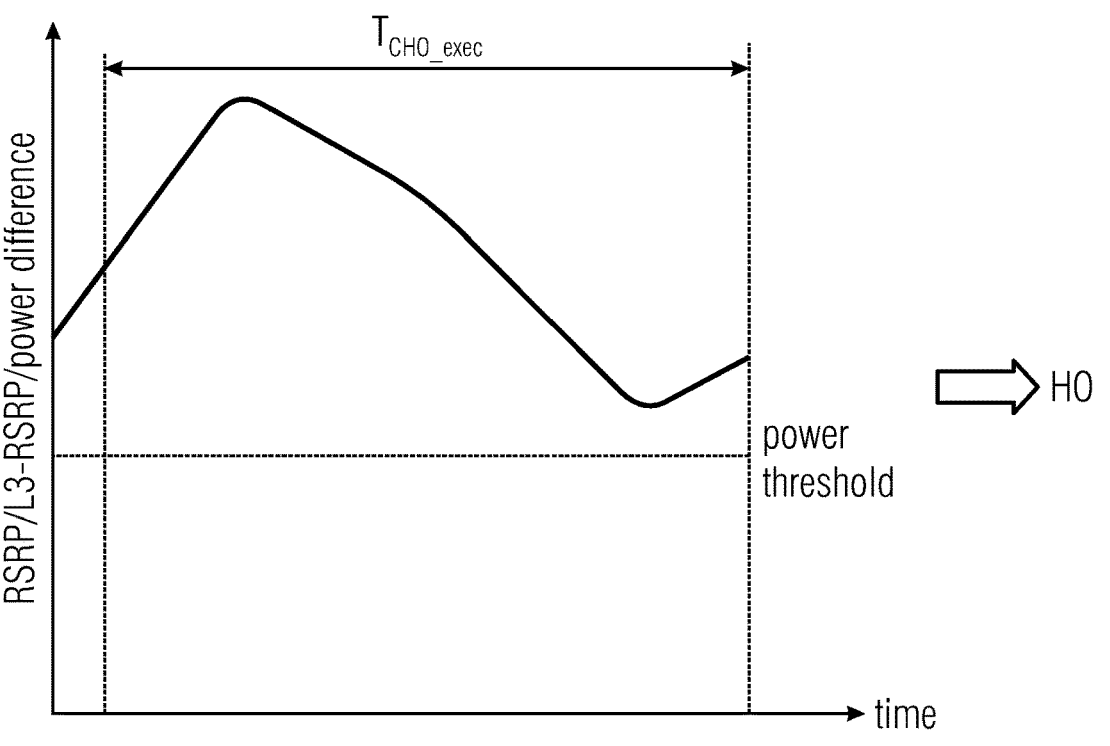

In accordance with a third aspect of the present invention, a conditional handover, CHO, execution timer is provided. In order to overcome the above-mentioned problems in a CHO that CHO only momentarily satisfies a handover event, a certain period or timer, also referred to as the conditional handover execution period, $T_{CHO\_exec}$, or CHO timer is provided, e.g., as a part of the CHO configuration. Using this timer, the UE in addition to satisfying the handover like event, also checks if this event sustains over the period $T_{CHO\_exec}$. If so, then the UE continues with the CHO execution. FIG. 18 illustrates an embodiment using the conditional handover execution period, $T_{CHO\_exec}$. FIG. 18 illustrates the signal strength over time, and a certain power level to be achieved for completing the handover. According to embodiments of the third aspect, the handover will only be completed in case the signal strength is sustained above the threshold for the conditional handover execution period $T_{CHO\_exec}$. In FIG. 18(*a*), the signal strength drops below the threshold during the period $T_{CHO\_exe}$ so that no handover is performed. On the other hand, in FIG. 18(*b*) the signal strength remains above the threshold during the period $T_{CHO\_exe}$, i.e. the initially measured signal strength sufficient for the HO is sustained for the period $T_{CHO\_exec}$ so that a handover is performed.

The $T_{CHO\_exec}$ may be specified with the same value or different values for each of the neighboring cells, e.g., in the CHO configuration. The length of the timer may depend on a signal strength of the neighboring cell(s). The length of the timer may be similar to the lengths of the current standardized TTT values. For example, cells with signal strengths beyond a particular value may be configured with a $T_{CHO\_exec}$ time shorter than a $T_{CHO\_exec}$ time for cells below or at the particular value. The design of the $T_{CHO\_exec}$ length may be analogous to the dependency of the TTTs on the threshold values as described with regard to the hierarchical TTT aspect (aspect 2).

In another embodiment, based on the amount of information that the network acquires, the $T_{CHO\_exec}$ without the need for a measurement TTT, i.e., the CHOs may be performed using only the $T_{CHO\_exec}$ without the TTT period measurements. The $T_{CHO\_exec}$ may be configured by the network and communicated to the UE in an RRC message. The $T_{CHO\_exec}$ may be provided as a value indicating an absolute time, or a number of averages that may be considered.

The criteria whether to perform HO which has to be satisfied within $T_{CHO\_exec}$ may be one or more of the following:

all the measurements satisfy the threshold or trigger value, at most or nor more than k measurements do not to satisfy the threshold or trigger value, at least k measurements satisfy the threshold or trigger value, at least k measurements plus the last measurements satisfy the threshold or trigger value, at least k measurements plus the last n measurements satisfy the threshold or trigger value, an average (weighted or unweighted) of the measurements over the $T_{CHO\_exec}$ satisfies the threshold or trigger value.

All the embodiments of the extension of the TTT of the first and second aspects may be combined with the $T_{CHO\_exec}$ of the third aspect.

For example, in accordance with an embodiment, applying the $T_{CHO\_exec}$ according to the third aspect may switch between network controlled and UE autonomous based on whether the UE has declared an RLF with the servgNB during the handover process. That is, if the UE is still in connection with the servgNB, the extension may be network controlled. On the other hand, if the UE declares an RLF with the servgNB, the extension may be UE autonomous.

Aspect 4

In accordance with a fourth aspect of the present invention, the first, second and third aspects of the present invention may be combined and, in addition, may be set or varied dependent om the UE mobility.

For example, in a CHO scenario, once the UE received the CHO configuration, the UE continues with the execution when it meets a certain condition with a cell based on the CHO configuration. However, in medium to high mobility scenarios, there may be a significant change in the neighboring cell(s) characteristics in the time period between reporting the MR and performing the CHO. As a result, the period of CHO execution to a new cell may be a more critical timeline. To address this issue, in accordance with embodiments of the fourth aspect of the present invention, the TTT and the $T_{CHO\_exec}$ may be modified of varied based on the UE mobility. For example, the TTT specifies a measurement period before receiving the CHO configuration, and $T_{CHO\_exec}$ specifies a measurement period after receiving the CHO configuration.

Figure 19A:
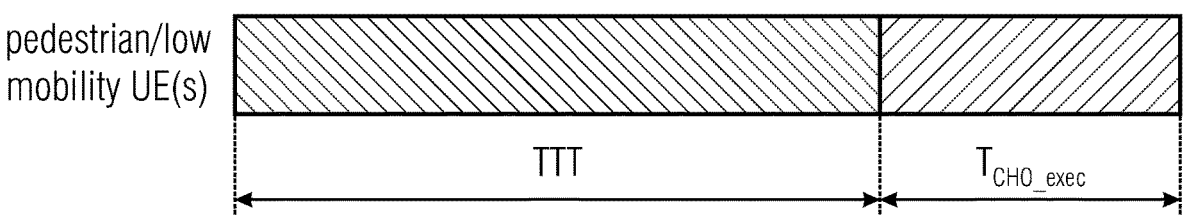
FIGS. 19(*a*)-19(*b*) illustrate an embodiment of a variation of the TTT and the $T_{CHO\_exec}$ based on the UE mobility.
Figure 19B:
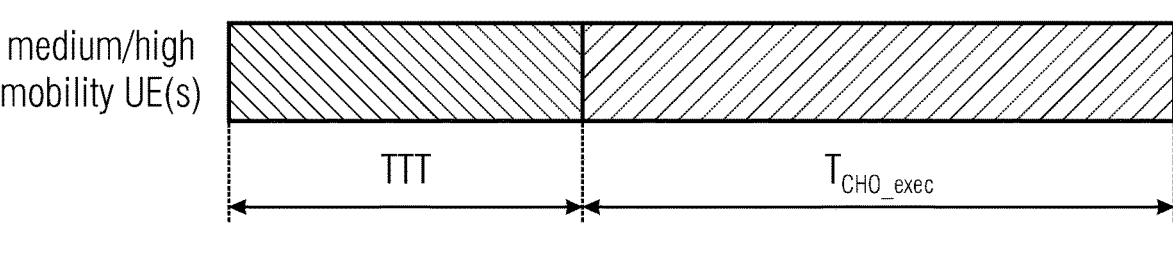

FIG. 19 illustrates an embodiment of a variation of the TTT and the $T_{CHO\_exec}$ based on the UE mobility. During the TTT, the UE may perform a set of measurements and in the period $T_{CHO\_exec}$ further measurements are done based on the list of cells provided in the CHO configuration. The configurability of these periods help in adapting to the different mobility states of the UE. For example, pedestrian or a low speed UE(s) may be configured with a value of the TTT being longer than the $T_{CHO\_exec}$ (see FIG. 19(a)) as there may not be a significant change in the neighboring cell(s) characteristics between the MR reporting and the CHO execution. This may be different for medium or high mobility UE(s), i.e., the neighboring cell(s) characteristics may change significantly between the MR reporting and the CHO execution. Therefore, medium or high mobility UE(s) may be configured with a value of the TTT being shorter than the $T_{CHO\_exec}$ (see FIG. 19(b)). The larger value for the $T_{CHO\_exec}$ is advantageous, as in the medium or high mobility scenario the measurement period after receiving the CHO configuration may be a period more critical than the TTT period.

General

In the embodiments described above, the network-indicated signaling, for example, from the gNB, may be semi-static in time and may configure the TTT using an RRC message, like a measurement configuration, before the start or onset of the handover preparation stage, while the CHO timer may be configured during the handover preparation.

Embodiments of the present invention have been described in detail above, and the respective embodiments and aspects may be implemented individually or two or more of the embodiments or aspects may be implemented in combination.

With regard to the above-described embodiments of the various aspects of the present invention, it is noted that they have been described in an environment in which a communication is between a transmitter, like a gNB or a UE, and a receiver, like a UE and a gNB. However, the invention is not limited to such a communication, rather, the above-described principles may equally be applied for a device-to-device communication, like a D2D, V2V, V2X communication. In such scenarios, the communication is over a sidelink between the respective devices. The transmitter is a first UE and the receiver is a second UE communicating using the sidelink resources. For example, the setup of the TTT configuration (TTT extension or hierarchical TTT extension or CHO timer) may also be sidelink-indicated by another UE, e.g. via sidelink control channel (SCI). For example, a group leader UE (GL-UE) or a UE which as a successfully performed HO may signal its TTT configuration via SL to neighboring UEs, which may adopt their configurations, lime TTT value or timer, accordingly. The corresponding hierarchy level may also be adopted depending on the group structure of a set of UEs. A TTT configuration may be groupcasted among a given group of UEs, e.g., either by a base station of by a GL-UE.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 20:
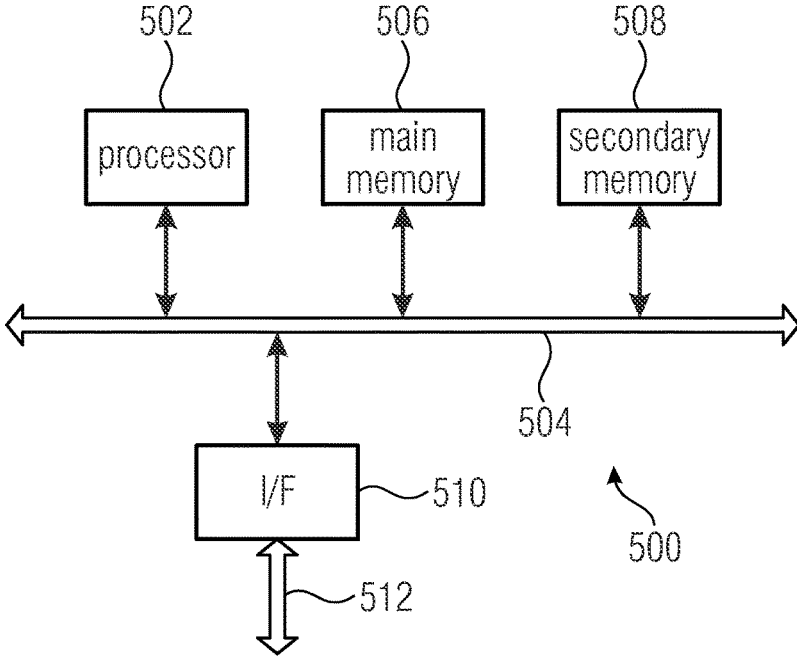
FIG. 20 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 20 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ACRONYMS AND SYMBOLS

BS Base Station
CBR Channel Busy Ratio
D2D Device-to-Device
EN Emergency Notification
eNB Evolved Node B (base station)
FDM Frequency Division Multiplexing
LTE Long-Term Evolution
PC5 Interface using the Sidelink Channel for D2D communication
PPPP ProSe per packet priority
PRB Physical Resource Block
ProSe Proximity Services
RA Resource Allocation
SCI Sidelink Control Information
SL sidelink
STTI Short Transmission Time Interval
TDM Time Division Multiplexing
TDMA Time Division Multiple Access
TPC Transmit power control/transmit power command
UE User Entity (User Terminal)
URLLC Ultra-Reliable Low-Latency Communication
V2V Vehicle-to-vehicle
V2I Vehicle-to-infrastructure
V2P Vehicle-to-pedestrian
V2N Vehicle-to-network
V2X Vehicle-to-everything, i.e., V2V, V2I, V2P, V2N

The invention claimed is:
1. An apparatus, comprising:
a transceiver circuit;
a processor circuit; and
a memory,
wherein the memory is arranged to store instructions,
wherein the processor circuit is arranged to execute the instructions,

wherein execution of the instructions causes the processor circuit to control the apparatus to communicate via the transceiver circuit with a device in a wireless communication system, wherein the wireless communication system comprises a plurality of cells, wherein the apparatus communicates with the device in a first cell among the plurality of cells, wherein the apparatus configures the device with a plurality of measurement periods, and at least one threshold, wherein the at least one threshold is for at least one channel condition for a second cell of the plurality of cells, wherein the device is arranged to select one of the plurality of measurement periods based on the at least one threshold, wherein the device is arranged to measure the at least one channel condition for the second cell over the selected one of the plurality of measurement periods when the device enters into a handover event from the first cell to the second cell.

2. The apparatus of claim 1, wherein the apparatus is arranged to provide to the device a hierarchical configuration for the plurality of measurement periods, wherein the hierarchical configuration is represented by at least two information elements, wherein a first information element of the at least two information elements indicates a hierarchical level, wherein a second information element of the at least two information elements indicates the at least one threshold.

3. The apparatus of claim 2, wherein the at least one threshold comprises a minimum threshold and a maximum threshold, wherein the second information element indicates the minimum threshold and the maximum threshold.

4. The apparatus of claim 2, wherein the apparatus is arranged to provide to the device a second hierarchical configuration for the plurality of measurement periods for a third cell among the plurality of cells.

5. The apparatus of claim 1, wherein the apparatus is arranged to configure the device with the plurality of measurement periods and the at least one threshold via a Radio Resource Control (RRC) message before an onset of the handover event.

6. The apparatus of claim 1, wherein the handover event comprises a conditional handover, and wherein the device is arranged to execute the conditional handover when at least one predefined condition is satisfied over a defined period when entering into the handover event.

7. The apparatus of claim 5, wherein the selected one of the plurality of measurement periods and the defined period are set based on a mobility of the device.

8. The apparatus of claim 7, wherein:

when the mobility of the device is less than a first mobility threshold, the selected one of the plurality of measurement periods is set to a first value and the defined period is set to a second value, when the mobility of the device is greater than the first threshold, the selected one of the plurality of measurement periods is set to a third value and the defined period is set to a fourth value, the first value is greater than the third value, and the second value is less than the fourth value.

9. The apparatus of claim 1, wherein the apparatus is arranged to operate at least the first cell,

wherein the apparatus comprises at least one of:

a macro cell base station, a small cell base station, a central unit of a base station, a distributed unit of a base station, a road side unit, a user equipment, a group leader, a relay, a remote radio head, an Access and Mobility Management Function, a Session Management Function, a core network entity, a mobile edge computing entity, a network slice, and a transmission/reception point, wherein the transmission/reception point enables an item to communicate using the wireless communication network.

10. A device, comprising:

a transceiver circuit;

a processor circuit; and a memory, wherein the memory is arranged to store instructions, wherein the processor circuit is arranged to execute the instructions, wherein execution of the instructions causes the processor circuit to control the device to communicate via the transceiver circuit with an apparatus in a wireless communication system, wherein the wireless communication system comprises a plurality of cells, wherein the device communicates with the apparatus in a first cell among the plurality of cells, wherein the device is provided with a plurality of measurement periods, and at least one threshold, wherein the at least one threshold is for at least one channel condition for a second cell of the plurality of cells, wherein the processor is arranged to select one of the plurality of measurement periods based on the at least one threshold, wherein the processor is arranged to measure the at least one channel condition for the second cell over the selected one of the plurality of measurement periods when the device enters into a handover event from the first cell to the second cell.

11. The device of claim 10, wherein the device is arranged to receive a hierarchical configuration for the plurality of measurement periods, wherein the hierarchical configuration is represented by at least two information elements, wherein a first information element of the at least two information elements indicates a hierarchical level, wherein a second information element of the at least two information elements indicates the at least one threshold.

12. The device of claim 11, wherein the at least one threshold includes a minimum threshold and a maximum threshold, wherein the second information element indicates the minimum threshold and the maximum threshold.

13. The device of claim 11, wherein the device is arranged to change from a first configuration to a second configuration based on the at least one channel condition for the second cell.

14. The device of claim 11, wherein the device comprises an aerial vehicle or a drone, and wherein the device is arranged to change from a first configuration to a second configuration based on one or more of a power saving criterion, a hovering altitude of the device, and a mobility speed of the device.

15. The device of claim 14, wherein the device is arranged to select the selected one of the plurality of measurement periods based on the device's hovering altitude, wherein the selected one of the plurality of measurement periods is less for a higher altitude than for a lower altitude.

16. The device of claim 10, wherein the handover event comprises a conditional handover, and wherein the device is arranged to execute the conditional handover when at least one predefined condition is satisfied over a defined period when entering into the handover event.

17. The device of claim 16, wherein the selected one of the plurality of measurement periods and the defined period are based on a mobility of the device.

18. The device of claim 16, wherein:
when the mobility of the device is less than a first mobility threshold, the selected one of the plurality of measurement periods is set to a first value and the defined period is set to a second value,
when the mobility of the device is greater than the first threshold, the selected one of the plurality of measurement periods is set to a third value and the defined period is set to a fourth value,
the first value is greater than the third value, and
the second value is less than the fourth value.

19. A method for a wireless communication system, wherein the wireless communication system comprises a plurality of cells, the method comprising:
communicating with a device in a first cell among the plurality of cells in the wireless communication system; and

providing the device with a plurality of measurement periods, and at least one threshold,
wherein the at least one threshold is for at least one channel condition for a second cell of the plurality of cells,
wherein the device is arranged to select one of the plurality of measurement periods based on the at least one threshold,
wherein the device is arranged to measure the at least one channel condition for the second cell over the selected one of the plurality of measurement periods when the device enters into a handover event from the first cell to the second cell.

20. A method for a wireless communication system, wherein the wireless communication system comprises a plurality of cells, the method comprising:
communicating with an apparatus in a first cell among the plurality of cells in the wireless communication system;
receiving a plurality of measurement periods, and at least one threshold, wherein the at least one threshold is for at least one channel condition for a second cell of the plurality of cells;
entering a handover event from the first cell to the second cell;
selecting one of the plurality of measurement periods based on the at least one threshold; and
measuring the at least one channel condition for the second cell over the selected one of the plurality of measurement periods upon the device entering into the handover event.

* * * * *